United States Patent [19]

Harrison et al.

[11] Patent Number: 4,464,282

[45] Date of Patent: Aug. 7, 1984

[54] ORGANIC MATERIALS

[75] Inventors: Kenneth J. Harrison; Edward P. Raynes, both of Malvern Link; Frances C. Saunders, Malvern Wells; David J. Thompson, Whitefield, all of England

[73] Assignee: The Secretary of State for Defence in Her Britannic Majesty's Government of the United Kingdom of Great Britian and Northern Ireland, London, England

[21] Appl. No.: 411,095

[22] Filed: Aug. 24, 1982

Related U.S. Application Data

[63] Continuation-in-part of Ser. No. 352,060, Feb. 24, 1982.

[30] Foreign Application Priority Data

| Feb. 25, 1981 | [GB] | United Kingdom | 8105959 |
| Feb. 25, 1981 | [GB] | United Kingdom | 8105961 |
| Mar. 5, 1981 | [GB] | United Kingdom | 8106995 |
| Sep. 30, 1981 | [GB] | United Kingdom | 8219530 |
| Aug. 18, 1982 | [GB] | United Kingdom | 8223855 |

[51] Int. Cl.$^3$ .................. G02F 1/13; C09K 3/34
[52] U.S. Cl. .................. 252/299.1; 260/369; 260/378; 260/380; 260/381; 260/383; 260/384; 350/346; 350/349; 350/350 R; 350/350 S
[58] Field of Search .................. 252/299.1; 350/349, 350/346, 350 R, 350 S; 260/369, 378, 380, 381, 383, 384

[56] References Cited

U.S. PATENT DOCUMENTS

| 3,164,436 | 1/1965 | Altermatt | 260/369 |
| 3,337,553 | 8/1967 | Altermatt | 252/299.1 |
| 3,342,831 | 9/1967 | Braun et al. | 260/369 |
| 3,585,219 | 6/1971 | Braun et al. | 260/369 |
| 4,126,626 | 11/1978 | Jost | 252/299.1 |
| 4,128,396 | 12/1978 | Wick et al. | 252/299.1 |
| 4,136,100 | 1/1979 | Epple | 252/299.1 |
| 4,176,113 | 11/1979 | Wick et al. | 252/299.1 |
| 4,232,949 | 11/1980 | Huffman | 252/299.1 |
| 4,232,950 | 11/1980 | Benham | 252/299.1 |
| 4,363,743 | 12/1982 | Moeller et al. | 252/299.1 |
| 4,391,489 | 7/1983 | Harrison et al. | 252/299.1 |
| 4,394,070 | 7/1983 | Brown et al. | 252/299.1 |
| 4,405,211 | 9/1983 | Harrison et al. | 252/299.1 |

FOREIGN PATENT DOCUMENTS

| 2104 | 5/1979 | European Pat. Off. | 252/299.1 |
| 44893 | 2/1982 | European Pat. Off. | 252/299.1 |
| 59036 | 9/1982 | European Pat. Off. | 252/299.1 |
| 74523 | 3/1983 | European Pat. Off. | 252/299.1 |
| 2009469 | 9/1971 | Fed. Rep. of Germany | 252/299.1 |
| 2920730 | 11/1979 | Fed. Rep. of Germany | 252/299.1 |
| 48-92667 | 12/1973 | Japan | 252/299.1 |
| 57-90080 | 6/1982 | Japan | 252/299.1 |
| 933520 | 8/1963 | United Kingdom | 260/369 |
| 956014 | 4/1964 | United Kingdom | 260/369 |
| 965006 | 7/1964 | United Kingdom | 252/299.1 |
| 1078092 | 8/1967 | United Kingdom | 260/369 |
| 1081890 | 9/1967 | United Kingdom | 252/299.1 |
| 1105568 | 3/1968 | United Kingdom | 260/369 |
| 1402704 | 8/1975 | United Kingdom | 252/299.1 |
| 1437444 | 5/1976 | United Kingdom | 260/369 |
| 2033929 | 5/1980 | United Kingdom | 252/299.1 |
| 2043097 | 10/1980 | United Kingdom | 252/299.1 |
| 2081736 | 2/1982 | United Kingdom | 252/299.1 |
| 2082196 | 3/1982 | United Kingdom | 252/299.1 |

OTHER PUBLICATIONS

Reid E. E., et al., JACS, vol. 43, pp. 2104–2119 (1921).
Hoffman, W. S., et al., JACS, vol. 45, pp. 1831–1838, (1923).

*Primary Examiner*—Teddy S. Gron
*Attorney, Agent, or Firm*—Cushman, Darby & Cushman

[57] ABSTRACT

A material suitable for a guest-host liquid crystal device comprises a solution of a liquid crystal material and a pleochroic dye wherein the pleochroic dye comprises at least one anthraquinone compound free from water solubilizing and ionic substituents and having the formula:

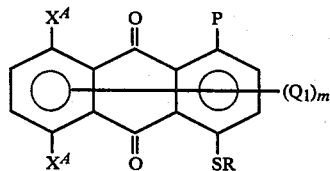

wherein
P is OH or $NH_2$; each group $X^A$ is independently selected from OH, $NO_2$, SR and $NZ_1Z_2$ provided that one group $X^A$ is SR and the other group $X^A$ is OH, $NO_2$ or $NZ_1Z_2$ is 1 or 2; each group $Q_1$ is independently alkyl having from 1 to 20 carbon atoms; each group R is independently selected from alkyl having from 1 to 20 carbon atoms, aryl having up to 15 carbon atoms and cycloalkyl having from 4 to 8 carbon atoms.

28 Claims, 3 Drawing Figures

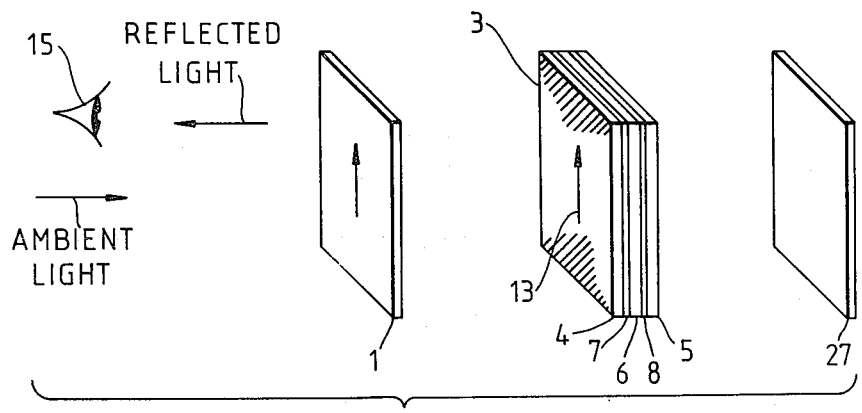
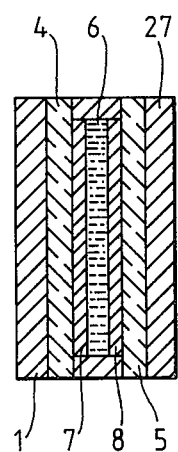
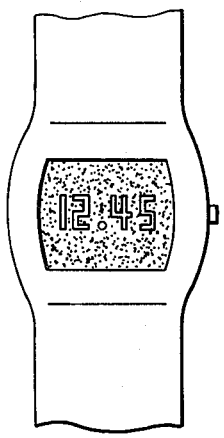

ORGANIC MATERIALS

This Application is continuation-in-part of copending U.S. patent application Ser. No. 352,060 filed Feb. 24, 1982 by the present Applicants.

BACKGROUND OF THE INVENTION

The present invention is concerned with organic materials, in particular with pleochroic dyes in solution with liquid crystal materials e.g. for electro-optic display applications.

Liquid crystal materials are well known organic materials which display phases, known as liquid crystal phases or mesophases, having a degree of molecular ordering intermediate between that of the fully ordered crystalline solid state and the fully disordered isotropic liquid state.

Electro-optical devices incorporating liquid crystal materials are well known and widely used as digital displays in such applications as watches, calculators and digital voltmeters. These devices utilise the optical contrast when an electric field is applied across a thin insulating film of suitable liquid crystal material. The molecules of the material (in a liquid crystal phase at the temperature of operation) are re-orientated by the field causing a change in an optical property of the part of the film where the field is applied, e.g. a change in ambient light scattering or transmissivity.

Liquid crystal materials have the property that their molecules can impose their ordering upon the molecules of other suitable dopant materials incorporated within them. This property is the basis of so-called "guest-host" devices e.g. display devices in which the host liquid crystal material and its guest material have one molecular configuration in the absence of an applied electric field and another molecular configuration when an electric field is applied across the material. The guest material is usually a pleochroic dye, which is a dye whose molecular absorption properties vary with the orientation of the electric vector of light incident upon its molecules.

The presence of such a dye can be used to enhance the contrast between the off state (with no electric field applied) and the on state (with electric field applied) of a liquid crystal display because the orientation of the dye molecules is in effect switchable by the effect of the applied electric field on the liquid crystal molecules and by the consequent re-orientation of the dye molecules by the guest-host effect.

As discussed further below there are several kinds of liquid crystal effects which can make use of the guest-host effect in electro-optical displays. These vary according to the kind of liquid crystal material used and the configuration of its molecules in the off state (e.g. as determined by the surface treatments of the substrates employed to contain the film of liquid crystal material).

In order to provide maximum contrast between the on and off states of a guest-host liquid crystal display it is important that the guest molecules adopt as closely as possible the time averaged orientation of the host molecules. However this is achieved only to a limited degree because of random thermal fluctuations. The degree to which the orientation varies from the ideal is measured by a quantity known as the order parameter S which is given by the following equation:

$$S = \tfrac{1}{2}(3\cos^2\theta - 1)$$  Equation (1)

where $\cos^2\theta$ is a time averaged term and $\theta$ is the instantaneous angular orientation of the molecules with respect to the time averaged orientation of the host molecules. The determination of the value of the order parameter S is well understood in the art; see for example the paper "A new absorptive mode reflective liquid crystal display device" by D. L. White and G. N. Taylor in the Journal of Applied Physics, 1974, 45 pages 4718 to 4723.

For perfect orientation the order parameter S is unity (that is $\theta$ is zero). Thus, pleochroic dyes for use in guest-host devices should have an order parameter in the liquid crystal host as high as possible (i.e. less than one but as near to one as possible). However they must also have adequate chemical, photochemical and electro-chemical stability, e.g. stability when exposed to atmospheric contaminants, electric fields (as in device operation) and to ultra-violet radiation. They should not be ionic or have any ionisable character (otherwise the liquid crystal material will lose its insulating nature and conduct making the device useless). They must also have sufficient solubility in the host materials; although the concentration of guest pleochroic dye required for the desired effect is generally quite small (e.g. not more than a few percent of dye) nevertheless many pleochroic dyes are unsuitable because they are essentially insoluble in liquid crystal materials.

In U.K. Patent Application G.B. No. 2043097A, liquid crystal compositions have been proposed which can contain symmetrical dyes of the formula:

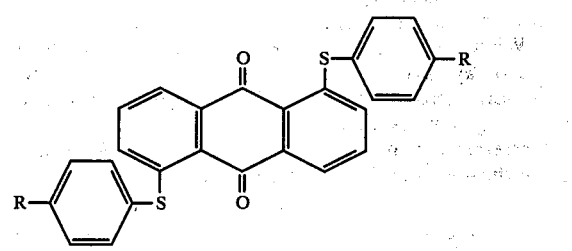

Formula A wherein $R_A$ is hydrogen or a non-ionic substituent. These dyes are proposed for use in liquid crystal materials of positive dielectric anisotropy only in that U.K. Patent Application.

In U.K. Patent Application No. 2082196A there are proposed for use in liquid crystal materials symmetrical dyes of the formula:

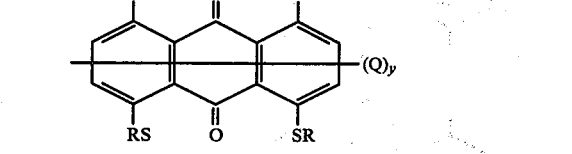

Formula B wherein R represents an optionally substituted alkyl or aryl radical, Q represents halogen, hydroxy, amino, alkylamino, dialkylamino, arylamino, nitro, alkyl or aryl and y represents an integer from 0 to 4.

The symmetrical dyes of formulae A and B, for example 1,5-bis(phenylthio)anthraquinone and 1,4,5,8-tetrakis(phenylthio) anthraquinone have high order parameters and adequate stability but in general their solubility in a number of liquid crystal materials is rather low for practical purposes; in particular they generally give somewhat poor contrast when used in an electro-optical display.

DETAILED DESCRIPTION OF THE INVENTION

According to the present invention in a first aspect a material suitable for a guest-host liquid crystal device comprises a solution of a liquid crystal material and a pleochroic dye wherein the pleochroic dye comprises at least one anthrquinone compound free from water solubilising and ionic substituents and having the formula:

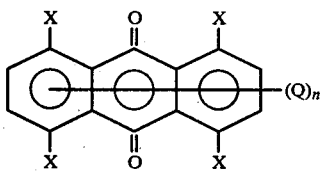

Formula I wherein
Q is $NH_2$, OH, alkyl, aryl, $NO_2$ or halo;
n is 0 to 4;
each X independently is H, —SR, —$NZ_1Z_2$ or Q;
each R independently is alkyl, aryl or cycloalkyl;
$Z_1$ & $Z_2$ are independently H, alkyl, cycloalkyl or aryl;
provided that there are at least two groups X which are different —SR groups.

Where one of the groups in Formula I is an alkyl group it preferably has not more than 20 carbon atoms, desirably not more than ten carbon atoms.

Where one of the groups in Formula I is an aryl or cycloalkyl group it preferably has not more than 15 carbon atoms and is desirably a phenyl group or cyclohexyl group respectively.

Preferred compounds within the scope of Formula I are those of the following formulae:

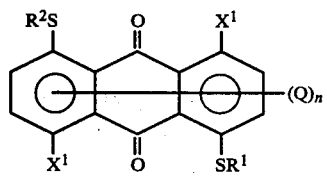

Formula II

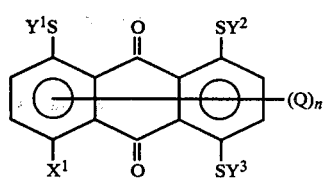

Formula III

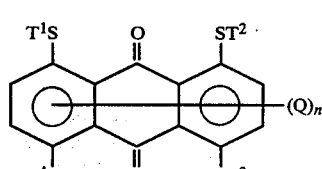

Formula IV wherein $R^1$ is aryl, $R^2$, $Y^1$ to $Y^3$ and $T^1$ to $T^4$ are each independently alkyl, aryl or cycloalkyl and each $X^1$ is independently H or —$NZ_1Z_2$ and Q, $Z_1$ and $Z_2$ are as hereinbefore defined, provided that all of the radicals represented by $R^1$ and $R^2$, or by $Y^1$ to $Y^3$ or by $T^1$ to $T^4$ are not identical.

Where R, $R^2$, $Z_1$, $Z_2$ any one of $Y^1$ to $Y^3$ or any one of $T^1$ to $T^4$ includes an alkyl group the alkyl group preferably has not more than 20 carbon atoms.

Where R, $R^2$, $Z_1$, $Z_2$, any one of $Y^1$ to $Y^3$ or any one of $T^1$ to $T^4$ includes an aryl group the aryl group preferably has not more than 15 carbon atoms.

The alkyl group represented by R, $R^2$, $Z_1$, $Z_2$, any one of $Y^1$ to $Y^3$ or any one of $T^1$ to $T^4$, which may be branched or straight chain, is preferably a lower alkyl group and more preferably contains from 1 to 4 carbon atoms and the cycloalkyl group is preferably a cyclohexyl group. The aryl group represented by R, $R^1$, $R^2$, $Z_1$, $Z_2$, any one of $Y^1$ to $Y^3$ or any one of $T^1$ to $T^4$ is preferably a mono- or bi-carbocyclic aryl group such as phenyl or naphthyl.

The alkyl group represented by Q, which may be branched or straight chain, preferably contains from 1 to 20 carbon atoms and is more preferably lower alkyl. The aryl group represented by Q is preferably monocarbocyclic aryl, such as phenyl.

The alkyl, aryl and cycloalkyl radicals represented by R, $R^1$, $R^2$, $Z_1$, $Z_2$, $Y^1$ to $Y^3$, $T^1$ to $T^4$, and Q may be substituted by non-ionic groups. Phenyl groups are preferably substituted in the para (4-) position with respect to the linkage to the N or S atom or to the anthraquinone nucleus although, in the case of methylphenylthio substituents, a product containing a 3-methylphenylthio group is usually more soluble than the same product containing a 4-methylphenylthio group. Preferred substituent groups for the alkyl radicals are alkoxy, preferably $C_1$ to $C_4$ alkoxy, halogeno, preferably chloro, or aryl, preferably mono-cyclic aryl, such as phenyl. Preferred substituent groups for the aryl radicals, e.g. those represented by $R^3$, $R^4$ and $T^5$ to $T^{10}$ below, and cycloalkyl radicals are alkyl and alkoxy, preferably lower alkyl and lower alkoxy and more preferably $C_1$ to $C_4$ alkyl and alkoxy, halogeno, preferably chloro, cycloalkyl, preferably cyclohexyl, and aryl, preferably monocyclic aryl, such as phenyl.

Throughout this specification the expressions "lower alkyl" and "lower alkoxy" mean alkyl and alkoxy radicals containing from 1 to 10 carbon atoms.

A preferred class of yellow to red dyes of Formula I are those in which n is 0 and two, three or four of the groups represented by X are —SR groups, the remainder being —$NZ_1Z_2$ or, more preferably H. A preferred class of red to blue dyes according to Formula I are those in which 2 X's are —SR groups and 2 X's are groups represented by Q, especially OH or $NH_2$ groups. It is further preferred in this latter class of dyes that n is 1 or 2 and that each Q represents an alkyl radical containing up to 20 carbon atoms in positions adjacent to the OH or $NH_2$ groups.

It is generally preferred that at least one and more preferably all of the —SR groups are arylthio groups, and more preferably are phenylthio groups. The difference between the two aryl groups may occur in the aromatic nucleus but preferably occurs in the nature and/or position of a substituent on the aromatic nucleus. Where there are only two —SR groups they are preferably in the 1 and 5 positions.

The unsymmetrical di-, tri- and tetra(substituted thio)anthraquinones are generally more soluble in liquid crystal materials than the equivalent symmetrical di-, tri- and tetra(substituted thio)anthraquinones such as are disclosed in U.K. Patent Application No. 2043097A and U.K. Patent Application No. 2082196A. In this specification the term "unsymmetrical" used in relation to poly(substituted thio)anthraquinones indicates that there are at least two different substituted thio groups in the molecule whereas the term "symmetrical" in the same context indicates that all the substituted thio groups in the molecule are identical. The present invention does however include compositions comprising a mixture of symmetrical and unsymmetrical poly(substituted thio)anthraquinones, as well as the pure unsymmetrical compounds themselves and mixtures thereof. It is however preferred that such compositions comprise at least 50% by weight of the unsymmetrical poly(substituted thio)anthraquinones and more preferably at least 75% by weight of these unsymmetrical compounds. The unsymmetrical compounds can be obtained in a pure form, i.e. free from the closely related symmetrical compounds by chromatographic separation procedures, especially by preparative or high pressure liquid chromatography. The main advantage of the pure unsymmetrical compounds over compositions containing mixtures of these with the symmetrical compounds is the greater solubility of the former which, as noted above, is of importance in obtaining good contrast in a liquid crystal display.

Solubility is, however, only one of the factors affecting the achievement of good contrast in a liquid crystal display, another factor is the extinction coefficient of the dye in the liquid crystal material. One useful indication of the ability of a dye to give good contrast is the product of the molar extinction coefficient and the solubility (in moles/liter). Solutions of dyes in liquid crystal compositions for use in electronic display applications should have a value for this product which is preferably at least 500 cm$^{-1}$ and more preferably at least 750 cm$^{-1}$. As the molar extinction coefficient for a dye does not vary significantly from one liquid crystal material to another, the preferred value of the product can be used to calculate the preferred minimum solubility of a particular dye in any liquid crystal material in order to give good contrast. Thus for a dye having a molar extinction coefficient of 11000 cm$^2$.moles$^{-1}$ the solubility should preferably be at least $4.5 \times 10^{-2}$ moles/liter and more preferably at least $6.8 \times 10^{-2}$ moles/liter. In fact the yellow dye of Example 1 has this value for the extinction coefficient and a molecular weight of 480 so that the solubility (wt %) for this dye should preferably be at least 2.2% and more preferably be at least 3.3%; the actual solubility of this dye in the liquid crystal material E43 (see Example 1) is 8.6%. For a dye having a molar extinction coefficient of 16000 cm$^2$.moles$^{-1}$ the solubility should preferably be at least $3.1 \times 10^{-2}$ moles/liter and more preferably at least $4.6 \times 10^{-2}$ moles/liter. In fact the red dye of Example 1 has this value for the extinction coefficient and a molecular weight of 650 so that the solubility of this dye (wt %) would preferably be at least 2% and more preferably at least 3%; the actual solubility of this dye in the liquid crystal material E43 is almost 15%. For a dye having a molar extinction coefficient 20000 cm$^2$.moles$^{-1}$ the solubility is preferably at least $2.5 \times 10^{-2}$ moles/liter and more preferably at least $3.8 \times 10^{-2}$ moles/liter. In fact the violet dye of Example 21 has this value for the extinction coefficient and a molecular weight of 590 so that the solubility should preferably be at least 1.5% and more preferably at least 2.2%; the actual solubility of this dye in the liquid crystal material E43 is 4.6%.

Dyes prepared for use in liquid crystal displays should preferably be as pure as possible in terms of their freedom from inorganic and other ionisable materials which can interfere with the operation of the display or products which are radiation sensitive and decompose within the display during operation. The dyes should also preferably be free from non- or inferior pleochroic materials, such as starting materials, intermediates and by-products, which do not contribute to the perceived contrast of the display. To obtain the dyes in a pure form, ie substantially free from interfering or deleterious matter, it is generally desirable to submit them to repeated recrystallisations from organics solvents, such as chloroform, and/or chromatographic separation procedures.

The compounds of the Formula I have very high stability in liquid crystal materials and high order parameters, generally greater than 0.7. The di(substituted thio)anthraquinones are of particular value because stable yellow dyes with high order parameters and good solubility have not heretofor been obtained.

Where the material according to the first aspect is for use as in an electro-optical display the addition of the dye to the liquid crystal material raises the viscosity of the latter and thus tends to increase the response time of the display. It is therefore desirable to use as little dye as possible (but sufficient to give an adequate electro-optical contrast). In this respect the dyes of Formula I are of particular value because many of them have very high extinction coefficients and thus only small quantities, generally less than 7%, are required in the liquid crystal material.

It has been found that the dyes of Formula I show adequate order parameter and solubility in a variety of liquid crystal materials, including materials of both positive and negative dielectric anisotropy.

Particular suitable liquid crystal host materials include:

a. mixtures incorporating cyanbiphenyls preferably together with a few percent of one or more compounds having a clearing point (liquid crystal to isotropic liquid transition) above 150° C. (eg a cyano-p-terphenyl) such as the materials E7 and E43 marketed by BDH Chemicals Ltd, of Broom Road, Poole, Dorset, England; (Compositions given below).

b. mixtures incorporating cyanophenyl cyclohexane compounds preferably together also with a few percent of one or more high clearing point compounds such as a cyanobiphenyl compound, eg the material ZLI 1132;

c. mixtures incorporating at least one cyanobiphenyl and at least one cyanophenylpyrimidine compound, preferably together also with a few percent of a high clearing point compound, eg a cyanophenylpyrimidinephenyl compound, eg the material ROTN 30;

d. mixtures incorporating esters, eg containing bicyclo (2,2,2) octane and benzene rings (which may contain fluorine substituents).

It has been cound that particularly suitable host liquid crystal materials are those which contain a mixture including roughly equal proportions by weight of 4-n-alkyl- or alkoxy-4-cyanobiphenyls and 1-(4'-cyanophenyl)-4-n-alkylcyclohexanes together forming between about 60 and 80% by weight of the mixture together with one or more materials of high clearing point (nematic-to-isotropic liquid transition temperature greater than 100° C.).

Any other liquid crystal material incorporating one or more compounds selected from the following known families may in fact be used in the host material:
where
i 
ii 
iii 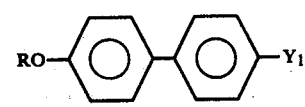
iv 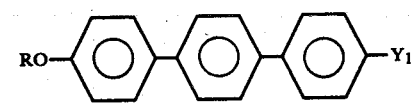
v 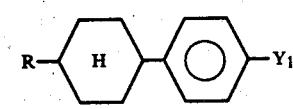
vi 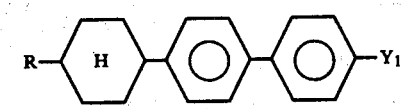
vii 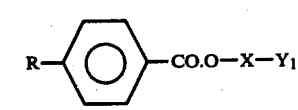
viii 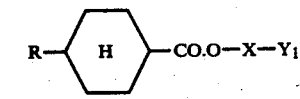
ix 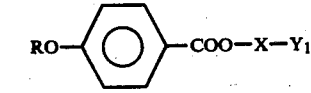
x 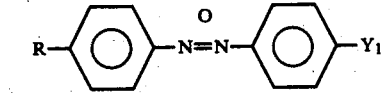
xi 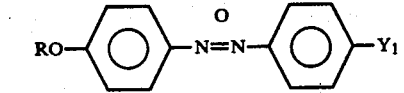
xii 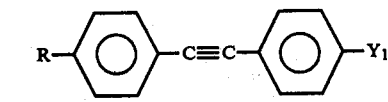
xiii 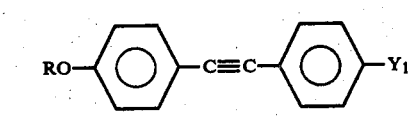
xiv 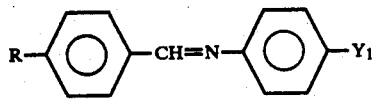
xv 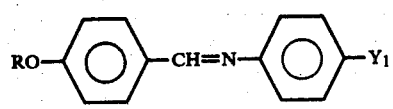
xvi 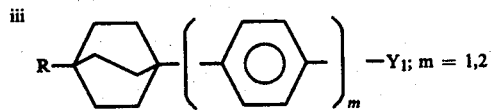
xvii 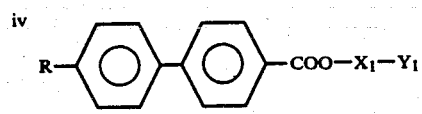
xviii 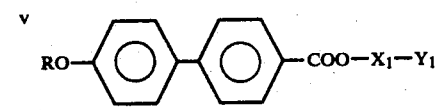
xix 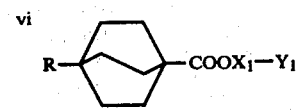
xx 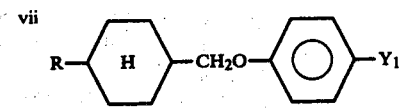
xxi 
xxii 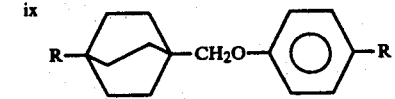
xxiii 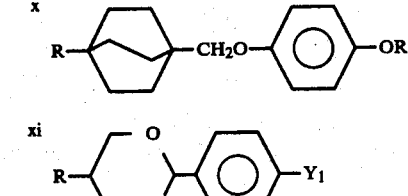
xxiv 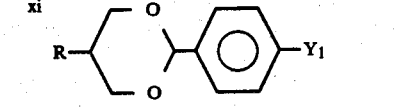
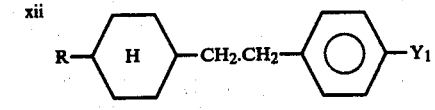

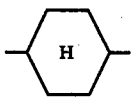

is a trans, 1,4 substituted cyclohexane ring,

is a 1,4 substituted bicyclo (2.2.2) octane ring, $X_1$ is a 1,4 phenylene group

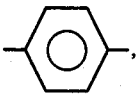

or a 4,4' biphenylyl group

or a 2,6 naphthyl group

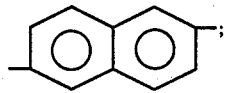

and $Y_1$ is CN, or $R^1$, or $OR^1$ or CO. O—$X_1$—$Y^1$ where $Y^1$ is CN, or $R^1$ or $OR^1$; the definition of $R^1$ being the same as that of R.

Preferably, the dye/liquid crystal solution contains at least 0.5% by weight of the dye and preferably between about 0.75% and 10% by weight of the dye, desirably between 1 and 5 percent. The exact amount of dye is not critical within the preferred range although the concentration is preferably not too low, in order to give a display whose contrast is enhanced as much as possible, and not too high in order to give a display whose electro-optical response is not slow.

Solutions of dye and liquid crystal material may be made in a conventional way simply by mixing the dye and the liquid crystal material together and then heating the mixture at about 80° C. with stirring for about 10 minutes and then allowing the mixture to cool.

Pleochroic dyes of Formula I above may be mixed together with other dyes (which may or may not also be of Formula I) to extend their spectral absorption properties, when dissolved in liquid crystal material. For example where a dye of Formula I is yellow and/or orange it may be mixed with a blue dye and a red dye. The relative proportions of the dyes mixed together are determined by the desired spectral response. This is an absorption curve extending across the spectrum to give a grey colouration. The dye mixture is then used with liquid crystal material as above or as follows.

According to the present invention in a second aspect a liquid crystal electro-optical display includes two electrically insulating substrates at least one of which is optically transparent, electrodes on the inner surfaces of the substrates and a film of dielectric material contained between the electrodes and the substrates, wherein the dielectric material is material according to the first aspect of the invention as defined above.

The liquid crystal/dye solution which is the material according to the first aspect of the invention may be used in any known electro-optical display as defined in the second aspect. Examples, which will be familiar to those skilled in the liquid crystal art, are the known devices operating by the following effects:

A. THE TWISTED NEMATIC EFFECT

In this case a film of nematic liquid crystal material of positive dielectric anisotropy has an off state in which (the long axes of) its molecules lie in the plane of the device substrate inner surfaces (which are normally parallel to one another), or at a small angle thereto, and undergo roughly a $\pi/2$ helical twist in orientation from one substrate to the other by virtue of the orientations at the surfaces caused by treatment, eg unidirectional rubbing, of those surfaces prior to assembly. This is the twisted "homogeneous texture". Application of an electric field between the electrodes on the respective substrate inner surfaces to give the on state causes re-arrangement of the liquid crystal molecules to lie (with their long axes) effectively perpendicular to the substrate inner surfaces in the "homeotropic texture". A change in optical activity (rotary power) of the film occurs between the on and off states by virtue of the molecular re-arrangement and the optical effect observed can be enhanced by the use of a linear polariser adjacent to one of the substrates and pleochroic dye dissolved in the liquid crystal material. The polariser has its polarisation axis parallel to the direction of the liquid crystal molecules at the adjacent substrate inner surface (or, more strictly, parallel to the average axis of projection of the molecules on that surface). By the guest-host effect the dye causes the off state to appear relatively dark or strongly colour whereas the on state appears clear or weakly coloured.

B. THE FRÉEDERICKSZ EFFECT IN NEGATIVE NEMATICS

In this case a film of nematic liquid crystal material of negative dielectric anisotropy has an off state in which its molecules lie perpendicular (ie in the homeotropic texture) to the substrate inner surfaces (which are parallel) by virtue of surface treatments to these inner surfaces prior to assembly. A single polariser is placed adjacent to one substrate with its transmission axis perpendicular to the normal to the inner surfaces. Application of an electric field between the electrodes on the respective substrate inner surfaces to give the on state causes re-arrangement of the liquid crystal molecules to lie parallel to the substrate inner surfaces (ie in the homogeneous texture). Incorporation of pleochroic dye in the liquid crystal material ensures that the off state appears relatively clear or weakly coloured whereas the on state appears dark or strongly coloured. The effect observed is enhanced by the presence of the polariser.

C. THE FRÉEDERICKSZ EFFECT IN POSITIVE NEMATICS

In this case a nematic liquid crystal material of positive dielectric anisotropy has an off state in which the molecules lie roughly parallel and in the plane of the substrate inner surfaces (which are parallel) by virtue of treatment of those surfaces prior to assembly (ie the homogeneous texture). A single polariser is placed adjacent to one substrate with its transmission axis parallel to the substrate inner surfaces.

Application of an electric field between the electrodes on the respective substrate inner surfaces to give the on state causes re-arrangement of the liquid crystal molecules to lie perpendicular to the substrate inner surfaces, ie the homeotropic texture. Incorporation of pleochroic dye in the liquid crystal material ensures that the off state appears relatively dark or strongly coloured whereas the on state appears colourless or weakly coloured as in the twisted nematic effect above. The effect observed is enhanced by the presence of the polariser.

D. THE PHASE CHANGE EFFECT (NEGATIVE CONTRAST TYPE)

In this case a cholesteric liquid crystal material of positive dielectric anisotropy and long molecular helical pitch, typically 2 μm, has an off state in which its molecules lie in random helices, ie the "focal conic texture". Application of an electric field between the electrodes on the respective substrate inner surfaces to give the on state causes re-arrangement of the liquid crystal molecules to lie perpendicular to the substrate inner surfaces (ie the homeotropic texture as for positive nematics in the Fréedericksz effect). Incorporation of pleochroic dye in the liquid crystal material gives an off state which appears relatively dark or strongly coloured and an on state which appears colourless or weakly coloured.

E. THE PHASE CHANGE EFFECT (POSITIVE CONTRAST TYPE)

In this case a cholesteric liquid crystal material of negative dielectric anisotropy and long molecular helical pitch has on off state in which its molecules lie perpendicular to the substrate inner surfaces, ie in the homeotropic texture. Application of an electric field between electrodes on the respective substrate inner surfaces causes re-orientation of the molecules to lie in the plane of the substrate inner surfaces in a helical arrangement ie the twisted homogeneous texture. Incorporation of pleochroic dye in the liquid crystal material gives an off state which is relatively colourless or weakly coloured and an on state which is relatively dark or strongly coloured.

F. THE FRÉEDERICKSZ EFFECT IN SMECTICS

In this case a smectic A liquid crystal material of positive dielectric anisotropy having a dielectric relaxation frequency fc less than about 10 kHz (ie the material has a negative dielectric anisotropy above this frequency) has an off state in which its molecules lie roughly parallel to the substrate inner surfaces with the molecules at the two inner surfaces parallel as in the Fréedericksz effect (c). Application of an electric field with a frequency less than fc to give the on state causes re-orientation of the liquid crystal molecules to lie perpendicular to the substrate inner surfaces, is in the homeotropic texture. The on state is preserved when the field is removed. Clearing of the on state may be achieved by the application of a high frequency electric field, ie with a frequency >fc. A single polariser is used, as with the Fréedericksz effect (c) above, when the molecular alignment at the two substrate inner surfaces in the off state is parallel. Incorporation of pleochroic dye in the liquid crystal material gives an off state which is relatively dark or strongly coloured and an on state which is clear or weakly coloured.

Use of the material defined in the first aspect of the invention above is not limited to electro-optical displays (as defined in the second aspect). The material may, in fact, be used in any known application of a dyed liquid crystal material. An example of such a 'non electro-optical' application is a thermally addressed display in which a symbol or character is provided in a smectic or cholesteric material by selective heating of the material eg by a laser (eg He/Ne) beam, to produce a localised change in the molecular texture of the material. The dye enhances the contrast between the different regions of the display, ie between those which are selectively heated and those which are not heated.

Reverting to the dyes of Formula I used in the material according to the first aspect, a preferred class of yellow dyes, containing two different —SR groups, has the general formula:

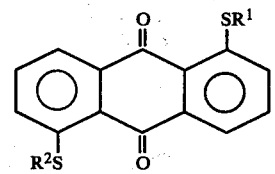

Formula V wherein $R^1$ is an aryl radical and $R^2$ is any of the groups represented by R above provided that $R^1$ and $R^2$ are not identical.

Radicals which may be represented by $R^2$ include alkyl, aryl and cycloalkyl radicals which may carry one or more non-ionic substituents such as those mentioned above. When $R^2$ is an aryl radical, it must be different from the aryl radical represented by $R^1$. This difference may occur in the aromatic nucleus or in the nature and/or position of a substituent thereon. Useful compounds of this type include those of the formula:

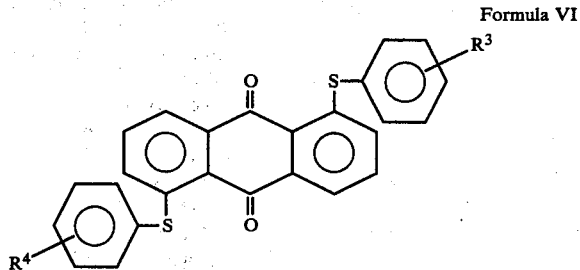

Formula VI wherein $R^3$ represents hydrogen or a non-ionic substituent, $R^4$ represents a non-ionic substituent and $R^3$ differs from $R^4$ in constitution and/or in its position on the phenyl radical.

Particular mention may be made of compounds of the formula:

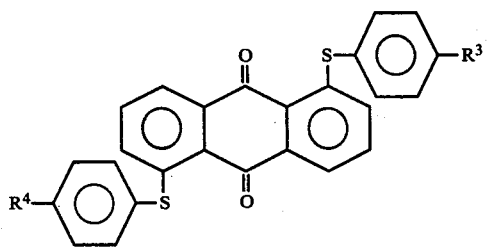

Formula VII wherein $R^3$ and $R^4$ have the meanings given above and $R^3$ differs in constitution from $R^4$. Especially useful compounds of this type include those in which $R^3$ is hydrogen and $R^4$ is a lower alkyl radical, especially t-butyl.

Dyes of Formula V may be prepared by reacting one equivalent of the thiol $R^1SH$ and one equivalent of the thiol $R^2SH$ with one equivalent of a 1,5-dihalogenoanthraquinone. The reaction is conveniently carried out in a solvent, for example dimethylformamide, and in the presence of an acid-binding agent, for example potassium carbonate.

The product of this reaction is a statistical mixture containing the compound of Formula V as major component together with the symmetrical compounds of the formulae:

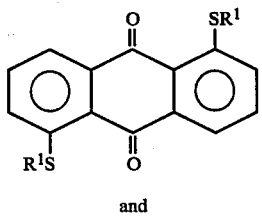

Formula VIII and

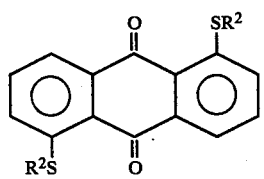

Formula IX

Compounds of Formula V may be prepared in a purer form by reacting a 1-halogeno-5-nitroanthraquinone with one equivalent of the first thio ($R^1SH$) under mild conditions and then reacting the product with one equivalent of the second thiol ($R^2SH$) at a higher temperature.

As noted above, known symmetrical dyes of Formula A such as 1,5-bis(phenylthio)anthraquinone, have rather low solubility in liquid crystal materials. Mixtures of two or more compounds of Formula A also have low solubilities in liquid crystal materials.

It is surprising that the unsymmetrical dyes of Formula V have significantly higher solubilities in liquid crystal materials than the symmetrical dyes of Formula A. The pure unsymmetrical dyes have higher solubilities than those products mentioned above which contain the symmetrical compounds of Formulae IX and VIII as impurities. However, these mixtures of unsymmetrical and symmetrical dyes have sufficiently higher solubilities than the pure symmetrical dyes to give them commercial utility.

A preferred class of red dyes, containing four —SR groups, not more than three of which are identical, has the general formula:

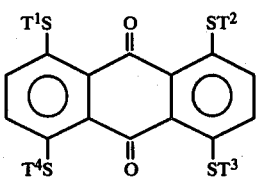

Formula XI wherein each of $T^1$, $T^2$, $T^3$ and $T^4$ may be any of the groups represented by R above, provided not more than three are identical.

Particularly useful compounds of Formula XI are those in which each of $T^1$, $T^2$, $T^3$ and $T^4$ is an aryl radical of which not more than three are identical. Differences between these radicals may occur in the aromatic nucleus or in the nature and/or position of the substituents thereon. Useful compounds of this type include those of the formula:

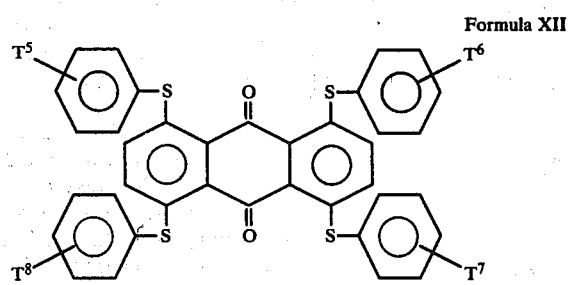

Formula XII wherein each of $T^5$, $T^6$, $T^7$ and $T^8$ independently represents hydrogen or a non-ionic substituent, as hereinbefore described, at least one of $T^5$, $T^6$, $T^7$ and $T^8$ being different from the other in either constitution or position.

Particular mention may be made of compounds of the formula:

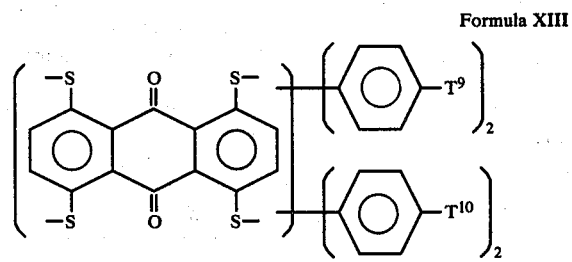

Formula XIII wherein $T^9$ represents hydrogen or a non-ionic substituent and $T^{10}$ represents a non-ionic substituent, $T^9$ and $T^{10}$ not being identical. Especially useful compounds of this type include those in which $T^9$ is hydrogen and $T^{10}$ is a lower alkyl radical, especially t-butyl.

Dyes of Formula XI may be prepared by reacting a 1,4,5,8-tetrahalogenoanthraquinone with one equivalent of each of the thiols: $T^1SH$, $T^2SH$, $T^3SH$, $T^4SH$, not more than three of $T^1$, $T^2$, $T^3$ and $T^4$ being identical. The reaction is conveniently carried out in a solvent, for example dimethylformamide, and in the presence of an acid-binding agent, for example potassium carbonate.

Thus, compounds of Formula XIII may be prepared by reacting the tetrahalogenoanthraquinone with two equivalents of a thiol of formula:

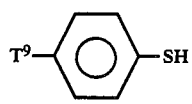

Formula XVIa and two equivalents of a thiol of formula:

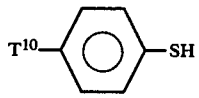

Formula XVIb

The product of these reactions is a statistical mixture in which compounds of Formula XI predominate together with lesser amounts of compounds in which $T^1$, $T^2$, $T^3$ and $T^4$ are identical.

As noted above, the symmetrical dyes of Formula B have solubilities in liquid crystal materials which are generally lower than is desirable for practical purposes.

It is surprising that the unsymmetrical dyes of Formula XI have significantly higher solubilities in liquid crystal materials than the symmetrical dyes of Formula XIV.

The preferred group of orange dyes of Formula III may be prepared by reacting two different substituted thiols with a trichloroanthraquinone, in the presence of an acid binding agent, to give a composition containing mainly the unsymmetrical compounds together with a smaller proportion of the symmetrical compounds. Alternatively one thiol may be reacted with a nitrodichloroanthraquinone under mild conditions to give a (substituted thio)dichloroanthraquinone and the second thiol reacted with the (substituted thio)dichloroanthraquinone intermediate under more severe conditions to give a single unsymmetrical tri(substituted thio)anthraquinone with only minor quantities of the symmetrical products.

The $-NZ_1Z_2$ groups and the groups represented by Q are preferably introduced prior to the $-SR$ groups by known methods for introducing such groups, e.g. by reacting an amino compound $HNZ_1Z_2$ with the appropriate chloranthraquinone.

Examples of other suitable compounds of Formula I are:
1-phenylthio-5-(naphth-2-ylthio)anthraquinone,
1-phenylthio-5-(dodecylthio)anthraquinone,
1-phenylthio-5-(4-nonylphenylthio)anthraquinone,
1-(phenylthio)-4,5,8-tri(cyclohexylthio)anthraquinone
1-(phenylthio)-4,5,8-tri(4-phenylphenylthio)anthraquinone,
1-(phenylthio)-4,5,8-tri(4-t-butylphenylthio)anthraquinone,
1-phenylthio-4-anilino-5-(4-methylphenylthio)anthraquinone,
1-phenylthio-4,8-di(butylamino)-5-butylthio-anthraquinone, and
1-phenylthio-5-cyclopentylthioanthraquinone.

Another preferred class of dyes falling within the scope of Formula I is that wherein n=0 or 1 Q=$C_{1-20}$ alkyl, two Xs are SR and the other two Xs are OH. This class is in fact a sub-class of another class which may be represented by Formula XV as follows.

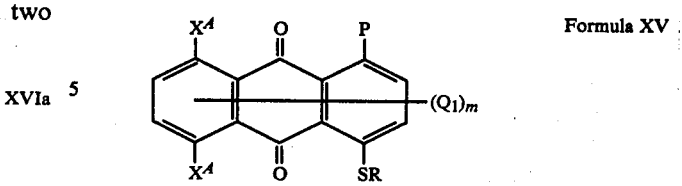

Formula XV wherein:
P is OH or $NH_2$;

each group $X^4$ is independently selected from OH, $NO_2$ SR and $NZ_1Z_2$ provided that one group $X^4$ is SR and the other group $X^4$ is OH, $NO_2$ or $NZ_1Z_2$ m is 1 or 2;

each group $Q_1$ is independently alkyl having from 1 to 20 carbon atoms;

each group R is independently selected from alkyl having from 1 to 20 carbon atoms, aryl having up to 15 carbon atoms and cycloalkyl having from 4 to 8 carbon atoms; and each of the groups $Z_1$ and $Z_2$ is independently selected from hydrogen, alkyl having from 1 to 15 carbon atoms, aryl having from 1 to 15 carbon atoms and cycloalkyl having from 4 to 8 carbon atoms.

The groups R, $Z_1$, $Z_2$ and $Q_1$ in Formula XV may optionally carry a non-ionic substituent. Where such a substituent is on an alkyl group it is preferably $C_{1-10}$ alkoxy, halogeno or monocyclic aryl. Where such a substituent is on an aryl group it is preferably $C_{1-10}$ alkyl, $C_{4-8}$ cycloalkyl or monocyclic aryl.

In Formula XV preferably m=2, P=OH, one of the groups $X^4$=OH and the other of the groups $X^4$=SR. The alkyl groups $Q_1$ are preferably adjacent to the OH groups.

A preferred sub-class of dyes within the scope of Formula XV may be represented by the formula:

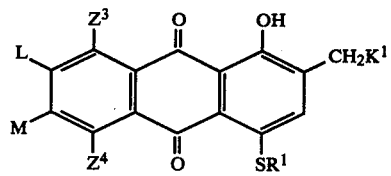

Formula XVI wherein:
each of the groups represented by L and M is independently selected from H and $CH_2K^2$;

each of the groups represented by $Z^3$ and $Z^4$ is independently selected from OH and $SR^2$; provided that when $Z^3$ is OH $Z^4$ is $SR^2$, L is $CH_2K^2$ and M is H and that when $Z^4$ is OH $Z^3$ is $SR^2$, L is H and M is $CH_2K^2$;

each of the groups represented by $K^1$ and $K^2$ is independently an alkyl group having from 1 to 20 carbon atoms $R^1$ is an aryl group having up to 15 carbon atoms;

$R^2$ is selected from alkyl groups having from 1 to 15 carbon atoms, aryl groups having from up to 15 carbon atoms, and cycloalkyl groups having from 4 to 8 carbon atoms provided that:

the groups $R^1$ and $R^2$ are different.

Preferably, dyes of Formula XVI are of the formula:

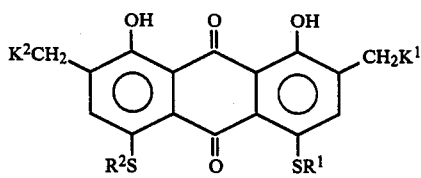

Formula XVII

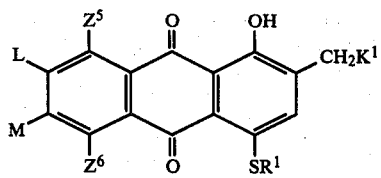

Formula XIX

Preferably, $K^1$ and $K^2$ are identical and have from 3 to 12 carbon atoms. They are preferably n-alkyl groups.

In Formula XVII the two groups represented by $R^1$ and $R^2$ are preferably monocyclic aryl groups, and desirably one is phenyl and the other is 4-alkylphenyl. Preferably the alkyl group contained in the 4-alkylphenyl group has a branched chain and from 3 to 8 carbon atoms. Preferably this alkyl group is t-butyl.

An especially preferred dye from the class represented by Formula XVII having particularly good solubility and a high order parameter is 1,8-dihydroxy-2,7-di-n-heptyl-5-(4-t-butylphenylthio)-4-phenylthioanthraquinone. Other useful dyes of this class include 1,8-dihydroxy-2,7-di-n-pentyl-4-(4-t-butylphenylthio)-5-phenylthioanthraquinone, 1,8-dihydroxy-2,7-di-n-dodecyl-4-phenylthio-5-(4-t-butylphenylthio)anthraquinone and 1,5-dihydroxy-2,6-di(3,5,5,5-tetramethyl-n-pentyl)-4-phenylthio-8-(4-t-butylphenylthio)anthraquinone.

The dyes of Formula XV generally exhibit bluish-red (purple) shades and are generally characterised by good solubility and high order parameters in liquid crystal materials.

The dyes of Formula XVI may be prepared by the successive substitution of the nitro groups in a compound of the formula:

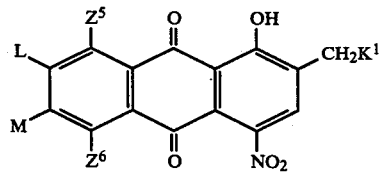

Formula XVII wherein:
L & M are H or $CH_2K^1$;
$Z^5$ & $Z^6$ are OH or $NO_2$
provided that
when $Z^5$ is OH $Z^6$ is $NO_2$, L is $CH_2K^2$ and M is H; and
when $Z^6$ is OH $Z^5$ is $NO_2$, L is H and M is $CH_2K^2$; and
$K^1$ & $K^2$ are $C_{1-20}$-alkyl,
with two different substituted thio groups, —$SR^1$ and —$SR^2$.

A preferred process has two stages, the first comprising the reaction of a mercaptan, $R^1SH$, with the compound of Formula XVII, in pyridine at a temperature around or below 30° C., to give an intermediate compound of the formula:

wherein:
L & M are H or $CH_2K^1$;
$Z^5$ & $Z^6$ are OH or $NO_2$
provided that
when $Z^5$ is OH $Z^6$ is $NO_2$, L is $CH_2K^2$ and M is H; and
when $Z^6$ is OH $Z^5$ is $NO_2$, L is H and M is $CH_2K^2$;
$K^1$ & $K^2$ are $C_{1-20}$-alkyl; and
$R^1$ is as hereinbefore defined,
and the second comprising the reaction of the intermediate compound of Formula XIX with a second mercaptan, $R^2SH$, at a higher temperature. The second stage, the reaction with the second mercaptan, is preferably performed in a polar solvent, more preferably a hydroxylic solvent such as an alkanol, e.g. isopropanol, and is also preferably performed at the reflux temperature of the solvent.

The starting material for this process may be prepared by the reaction of quinizarin or anthrarufin with one or more aldehydes of the formula $K^1CHO$ and $K^2CHO$ in the presence of pyridine to give a 2,7-dialkylquinizarin or a 2,6-dialkylanthrarufin and nitrating this to give a 2,7-dialkyl-4,5-dinitroquinizarin or a 2,6-dialkyl-4,8-dintro-anthrarufin of Formula XVII.

It has also been found that some of the intermediate compounds of Formula XIX and the reduction products thereof, wherein the $NO_2$ group is converted into an $NH_2$, have good solubilities and/or order parameters in liquid crystal materials and according to a further feature of the present invention there is provided an anthraquinone dye of the formula:

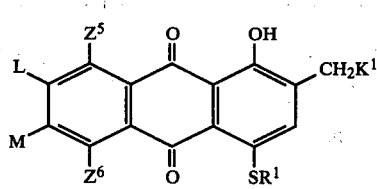

Formula XX wherein:
L and M are H or $CH_2K^1$;
$Z^5$ and $Z^6$ are OH, $NO_2$ or $NH_2$
provided that
when $Z^5$ is OH, $Z^6$ is $NO_2$ or $NH_2$, L is $CH_2K^2$ and M is H; and
when $Z^6$ is OH, $Z^5$ is $NO_2$ or $NH_2$, L is H and M is $CH_2K^2$;
$K^1$ and $K^2$ are $C_{1-20}$-alkyl; and
and $SR^1$ is as hereinbefore defined.

The compound of Formula XX wherein $Z^5$ or $Z^6$ is $NH_2$ may be prepared from the compounds of the same formula in which $Z^5$ or $Z^6$ represent $NO_2$ by reduction with a mixture of sodium sulphide and sulphur in an aqueous alkaline medium.

Preferred compounds within the class represented by Formula XX are those in which $Z^5$ is OH and $Z^6$ is $NH_2$ and those in which $Z^6$ is OH and $Z^5$ is $NH_2$. Examples of compounds of Formula XX are 1,8-dihydroxy-4-phenylthio-5-amino-2,7-di(3,5,5,5-tetramethyl-n-pentyl)anthraquinone, 1,5-dihydroxy-4-phenyl-2,6-di(3,5,5,5-tetramethyl-n-pentyl) 8-aminoanthraquinone and 1,5-dihydroxy-4-phenyl-8-nitro-2,6-di(3,5,5,5-tetramethyl-n-pentyl)anthraquinone.

The preparation and properties of dyes of Formula I are further illustrated by the following Examples in which all parts and percentages are by weight unless otherwise indicated and the letters "AQ" are used to represent anthraquinone.

DESCRIPTION OF THE PREFERRED EMBODIMENTS

Example 1

1,4,5,8-tetrachloroanthraquinone (12 g) was added to a stirred mixture of dimethylformamide (100 ml), potassium carbonate (12 g), thiophenol (10.4 ml) and 4-t-butylphenylthiol (14.8 ml). The reaction mixture was heated to 130°–140° C. and maintained at that temperature for 5 hours. After cooling overnight, the reaction product was filtered and the filter cake was washed several times with a 50:50 mixture of ethanol and 2N sodium hydroxide solution. The washed product was then washed with very dilute acetic acid, washed acid free with water, dried at 50° C. in vacuo, dissolved in the minimum amount of boiling toluene, filtered, reprecipitated by the addition of methanol, filtered of, washed with methanol and dried at 50° C.

The product contained the following substituted anthraquinones (AQ):

TABLE 1

| Component | Wt. % |
| --- | --- |
| tetrakis-(phenylthio)AQ | 1% |
| tris-(phenylthio)-t-butylphenylthio-AQ | 19% |
| bis-(phenylthio)-bis-(t-butylphenylthio)AQ | 65% |
| tris-(t-butylphenylthio)-phenylthio-AQ | 11% |
| tetrakis-(t-butylphenylthio)AQ | 4% |

The solubility of the product was measured in liquid crystal material E43 marketed by BDH Chemicals Limited of Broom Road, Poole, Dorset, England. E43 contains the compounds:

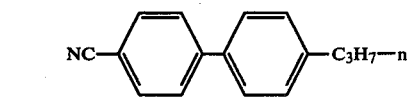

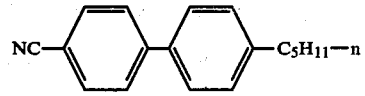

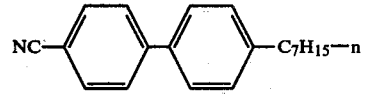

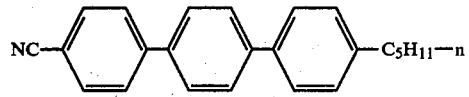

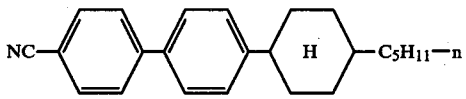

The solubility of the product in E43 at 20° C. is 14.7%. For comparison, the solubilities of pure 1,4,5,8-tetrakis(phenylthio)anthraquinone and pure 1,4,5,8-tetrakis(4-t-butylphenylthio)anthraquinone in the same material are, respectively, <1% and 1.8%.

Example 2

The procedure of Example 1 was repeated except that the 4-t-butylphenylthiol was replaced by the equivalent quantity of 4-methylphenylthiol.

Example 3

Thiophenol (2.97 g), 4-phenylphenylthiol (4.38 g) and potassium carbonate (3.73 g) were stirred in 23 ml dimethylformamide(DMF) at 120° C. for 1 hour and cooled to ambient temperature. 1,4,5,8-Tetrachloroanthraquinone (3.46 g) was added, the mixture held at 120° C. for 4 hours and then cooled to ambient. After the addition of 20 ml ethanol the mixture was worked up by the following procedure. After filtration and washing with a 50:50 mixture of 2N NaOH and ethanol the crude product was slurried in 30 ml of the same solvent mixture, stirred for 30 minutes, filtered, washed successively with the caustic soda/ethanol solvent and water and dried at 80° C.

The work-up product was boiled in 30 ml chloroform, filtered cold and the filtrate added dropwise to 250 ml petroleum ether (100–120). After stirring for 1 hour the precipitate was filtered, washed with 40–60 petroleum ether and dried at 80° C. The product contained about 90% unsymmetrical tetra(substitutedthio)anthraquinones, carrying both phenylthio and 4-phenylphenylthio groups, the remainder being symmetrical tetra(substitutedthio)anthraquinones, carrying either phenylthio or 4-phenylphenylthio groups.

Example 4

1.98G thiophenol, 2.07 g of cyclohexylthiol and 2.02 g of KOH in 30 ml ethanol were stirred at reflux for 1 hour and cooled to ambient temperature. 1,4,5,8,-Tetrachloro-AQ (2.31 g) was added and the mixture stirred at reflux temperature for 16 hours before cooling to room temperature and working up according to the work-up procedure of Example 3. The crude solid was dissolved in 100 ml hot chloroform, screened and drowned into 300 ml methanol over a 5 minute period. The drownout mass was stirred for 30 minutes and the solid filtered, washed with methanol and dried at 80° C. (yield 2.8 g). The main constituents of the product are unsymmetrical tetra(substituted thio)AQs, carrying cyclohexylthio and phenylthio groups in the 1, 4, 5 and 8 positions.

Example 5

The procedure of Example 4 was repeated except for the replacement of the cyclohexylthiol by the equivalent weight of 4-methoxyphenylthiol. The main constituents of the product are unsymmetrical tetra(substituted thio)AQs carrying phenylthio and 4-methoxyphenylthio groups in the 1, 4, 5 and 8 positions.

Example 6

1,5-Dichloroanthraquinone (12 g) was added to a stirred mixture of dimethylformamide (100 ml), potassium carbonate (8.0 g), thiophenol (thiol 1: 7.0 ml) and 4-t-butylphenylthiol (thiol 2: 8.0 ml). The reaction mixture was heated to 130°-140° C. and maintained at that temperature for 5 hours. After cooling overnight, the reaction product was filtered and the filter cake was washed several times with a 50:50 mixture of ethanol and 2N sodium hydroxide solution. The washed product was then washed with very dilute acetic acid, washed acid-free with water, dried at 50° C. in vacuo, dissolved in the minimum amount of boiling toluene, filtered, re-precipitated by the addition of methanol, filtered off, washed with methanol and dried at 50° C.

The product contained 55% of 1-(4-t-butylphenylthio)-5-phenylthioanthraquinone, the remainder being the two symmetrical 1,5-disubstituted anthraquinones.

The following 4 analogous products were prepared by the method of Example 6 using the equivalent quantities of the appropriately substituted thiols in place of the thiophenol and the 4-t-butylphenylthiol used in Example 6.

Example 7

| Thiol 1: | thiophenol |
| --- | --- |
| Thiol 2: | 3-methylphenylthiol |
| Main product: | 1-phenylthio-5(3-methylphenylthio)AQ |
| % in compn: | 48% |

Example 8

| Thiol 1: | 3-methylphenylthiol |
| --- | --- |
| Thiol 2: | 4-t-butylphenylthiol |
| Main product: | 1(3-methylphenylthio)-5(4-t-butylphenylthio)AQ |
| % in compn: | 64% |

Example 9

| Thiol 1: | 3-methylphenylthiol |
| --- | --- |
| Thiol 2: | 4-methylphenylthiol |
| Main product: | 1(3-methylphenylthio)-5(4-methylphenylthio)AQ |

Example 10

| Thiol 1: | thiophenol |
| --- | --- |
| Thiol 2: | 4-methylphenylthiol |
| Main product: | 1-phenylthio-5(4-methylphenylthio)AQ |

Example 11

A mixture of 73.7 g 4-t-butylphenylthiol (thiol 2) 25 g potassium hydroxide, and 640 ml ethanol was heated at reflux temperature for 1 hour and cooled to room temperature. To this mixture was added 86.5 g 1-phenylthio-5-chloroanthraquinone, over a period of 5 minutes, the mixture heated to reflux and held there for 16 hours. At the end of the reaction period the mixture was cooled to room temperature, the solid product filtered off and washed with 200 ml 50% 2N NaOH/ethanol. The crude product was reslurried into a further 200 ml of the same mixed solvent, stirred for 30 minutes, refiltered, washed successively with 100 ml 50% 2N NaOH/ethanol and 100 ml water and dried at 80° C.

The product was extracted with 2 liters 15:1 mixture of 100-120 petroleum ether and chloroform at reflux for 48 hours following which the chloroform was distilled off. The slurry in petroleum ether was cooled and filtered after 24 hours at room temperature, washed with 100 ml 40-60 petroleum ether and dried at 80° C.

After repeated recrystallisation from methanol the product, containing about 88% 1-phenylthio-5-(4-t-butylphenylthio)anthraquinone, had a melting point of 241° C.

The 1-phenylthio-5-chloroanthraquinone used above was prepared by adding 72.5 g 1-nitro-5-chloroanthraquinone and 500 ml ethanol to a mixture of 78 g of thiophenol (thiol 1), 32 g potassium carbonate and 125 ml dimethylformamide (previously refluxed at 120° C. for 2 hours and cooled to room temperature) and heating to 40° C. for 16 hours. After cooling and standing for 48 hours the solid product was filtered, washed with 1 liter 40% aqueous ethanol, reslurried in 500 ml of the same solvent, stirred for 30 minutes, filtered and washed successively with 200 ml 40% aqueous ethanol and 1 liter water. The product was reslurried in 500 ml water for 30 minutes, filtered, washed with water and finally with 100 ml ethanol and dried at 80° C.

Table 2 compares the solubilities of the dyes of Examples 6 and 11, with those of the equivalent symmetrical dyes, in the liquid crystal material E43 (see Example 1) at 20° C.

TABLE 2

| No. | Dye | Solubility (wt. %) |
| --- | --- | --- |
| 1 | 1,5-bis(phenylthio)anthraquinone | 1.7 |
| 2 | 1,5-bis(4-t-butylphenylthio)anthraquinone | 2.0 |
| 3 | Physical 50/50 mixture of 1 and 2 above | <2.0 |
| 4 | 1-phenylthio-5-(4-t-butylphenylthio) anthraquinone (product of Example 11) | 8.6 |
| 5 | Chemical mixture of 1, 2 and 4 above (product of Example 6) | 3.2 |

It is clear from the solubility data listed in Table 2 that the unsymmetrical product, either alone or in admixture with the symmetrical equivalents, has a considerably higher solubility in the liquid crystal medium than either of the symmetrical products or their mixture. This higher solubility is not only completely unexpected but of considerable commercial significance in view of the demand for liquid crystal displays which are stable over a wide temperature range from below 0° C. to around 100° C.

The following six analogous compositions were prepared according to the process of Example 11 using the equivalent quantities of the appropriately substituted thiols in place of the thiols used in Example 11.

Example 12

| Thiol 1: | thiophenol |
| --- | --- |
| Thiol 2: | 3-methylphenylthiol |
| Main product: | 1-phenylthio-5(3-methylphenylthio)AQ |
| % in compn.: | 81% |
| M.P.: | 227° C. |

(compn. = composition
M.P. = melting point)

Example 13

| | |
|---|---|
| Thiol 1: | thiophenol |
| Thiol 2: | 4-methylphenylthiol |
| Main product: | 1-phenylthio-5(4-methylphenylthio)AQ |
| % in compn.: | 83% |
| M.P.: | 269° C. |

Example 14

| | |
|---|---|
| Thiol 1: | thiophenol |
| Thiol 2: | n-butylthiol |
| Main product: | 1-phenylthio-5(n-butylthio)AQ |
| % of compn.: | 98% |
| M.P.: | 163° C. |

Example 15

| | |
|---|---|
| Thiol 1: | thiophenol |
| Thiol 2: | 4-phenylphenylthiol |
| Main product: | 1-phenylthio-5(4-phenylphenylthio)AQ |
| % in compn.: | 91% |

Example 16

| | |
|---|---|
| Thiol 1: | thiophenol |
| Thiol 2: | cyclohexylthiol |
| Main product: | 1-phenylthio-5-cyclohexylthio-AQ |

Example 17

| | |
|---|---|
| Thiol 1: | thiophenol |
| Thiol 2: | 4-methoxyphenylthiol |
| Main product: | 1-phenylthio-5-(4-methoxyphenylthio)AQ |

Example 18

A solution of 1.98 g of thiophenol, 2.99 g of 4-t-butylphenylthiol and 2.48 g of potassium carbonate in 20 ml of DMF was heated to 115° C. and stirred at this temperature for 1 hour. To the solution was added 3.28 g of 1,5-dinitro-4,8-diamino-AQ and the mixture stirred for 8 hours at 115° C. It was then cooled to room temperature, filtered, washed successively with DMF, water and ethanol and dried to give 1.7 g of crude product.

The crude product was purified by screening in hot chloroform and, after cooling, passage through a silica-packed chromatography column. The column was eluted with chloroform and the main blue band was collected and evaporated to dryness. The dry material was slurry washed with 20 ml methanol, filtered, washed with methanol and dried at 80° C. to give 0.2 g of purified composition containing 63% 1-phenylthio-5(4-t-butylphenylthio)-4,8-diamino-AQ.

The 1,5-dinitro-4,8-diamino-AQ was prepared from 1,5-diamino-AQ-bis-N,N-dimethylformidinium chloride by the method of Example 2 of U.K. Patent Specification No. 1041528 and the 1,5-diamino-AQ-bis-N,N-dimethylformidinium chloride was made from 1,5-diamino-AQ by the method of Example 2 of German Patent Specification No. 1132931.

Example 19

Thiophenol(1.98 g), 3-methylphenylthiol(2.33 g) and potassium carbonate(2.02 g) were stirred at 115° C. in 15 ml DMF for 1 hour and cooled to room temperature. To this mixture were added 4.24 g of 1,5-dibromo-4,8-di(methylamino)AQ over 5 minutes and the mixture reheated to 120° C. and stirred at this temperature for 16 hours. After cooling to ambient temperature and the addition of 25 ml ethanol the crude material was worked up as in Example 3 to yield 4.35 g. The worked up material was dissolved in chloroform and passed through a silica-packed chromatography column eluting with chloroform and collecting the main red band. After evaporation of the chloroform, washing with methanol and drying at 80° C. the yield of purified material was 4.09 g containing 48.9% of 1-phenylthio-5(4-t-butyl phenylthio)-4,8-di(methylamino)AQ, the remainder being the two symmetrical di(substituted thio)AQs.

Example 20

A mixture of 1.24 g of thiophenol, 1.87 g of 4-t-butylphenylthiol and 1.56 g of potassium carbonate in 10 ml DMF were stirred at 120° C. for 1 hour and cooled to ambient temperature. To the cooled mixture were added 1.73 g of 1-nitro-5,8-dichloro-4-anilino-AQ and the mixture stirred at 120° C. for 5 hours. After cooling to ambient temperature and adding 27 ml ethanol and 40 ml water the solid was filtered, washed with water and ethanol and dried to yield 3.55 g of crude material.

The crude material was dissolved in chloroform and passed through a silica-packed chromatography column, eluting with chloroform and collecting the main orange band. After evaporating the solvent, 30 ml methanol were added and the solid material filtered, washed with methanol and dried at 50° C. (yield 2.95 g). The purified material contained 65% unsymmetrical tri(substituted thio)AQs, the remainder being mainly the two symmetrical tri(substituted thio)AQs.

The 1-nitro-4-anilino-5,8-dichloro-AQ was prepared according to the following method:

A mixture of 7.83 g of aniline and 10 g of 1,4,5-trichloro-8-nitro anthraquinone in 75 ml 2-ethoxyethanol was heated at 120° C. for 18 hours. The product was filtered, washed with ethanol, slurried in 50 ml ethanol and refiltered. It was then stirred into 50 ml 2N HCl, filtered, washed acid free with water and dried at 80° C. The final stage of purification consisted of stirring the dry material in 50 ml chloroform for 20 minutes, filtering, washing which chloroform and drying at 80° C. to yield 5.9 g of product (m.p. 216°-7° C.) having a purity of 90.5%, by chromatography

Example 21

A mixture of 1.48 g thiophenol, 2.24 g 4-t-butylphenylthiol and 1.5 g KOH were refluxed in 15 ml ethanol for 1 hour and cooled to ambient temperature. To the cooled mixture were added 1.5 g of 1,4,5-trichloro-AQ and the mixture refluxed for 16 hours. After cooling to ambient temperature the mixture was worked up as described in Example 3. The 2.3 g of worked up material contained 62% unsymmetrical tri(-substituted thio)AQs, i.e. di(phenylthio)-(4-t-butylphenylthio)AQ and phenylthiodi(4-t-butylphenylthio)AQ, the remainder being mainly the two symmetrical tri(substituted thio)AQs.

Example 22

A mixture of 0.127 g of thiophenol and 0.065 g KOH in 15 ml ethanol was refluxed for 1 hour and cooled to ambient temperature. To the cooled mixture was added 0.66 g of 1,5-di(4-t-butylphenylthio)-4-chloro-AQ and the mixture refluxed for 16 hours before cooling to ambient temperature. After working up as described in Example 3 the yield of dry material was 0.6 g. This material contained 78% of 1,5-di(4-t-butylphenylthio)-4-phenylthio-AQ.

The 1,5-di(4-t-butylphenylthio)-4-chloro-AQ was prepared as follows:

A mixture of 2.98 g of 4-t-butylphenylthiol and 0.51 g KOH in 10 ml ethanol was refluxed for 1 hour and cooled to ambient temperature. To this was added 1.56 g of 1,4,5-trichlor-AQ and the mixture stirred at 40° C. for 16 hours before cooling to ambient temperature. After working up the crude material as described in Example 3 it was further purified by dissolving in 100 ml 60–80 petroleum ether, screening and passage through a silica-packed chromatography column, eluting with the same solvent and collecting the middle orange band. After evaporation of the solvent, washing with methanol and drying the yield of purified material was 0.9 g.

Example 23

(a) Preparation of 1,5-dihydroxy-2,6-dinonyl-4-phenylthio-5-nitroanthraquinone A mixture of 1.1 ml (0.01 moles) of thiophenol and 5.8 g of 1,5-dihydroxy-2,6-dinonyl-4,8-dinitro-AQ (0.01 moles) in 50 ml pyridine was stirred for 30 minutes at room temperature and then drowned out into 100 ml water. Concentrated HCl (75 ml) was added and the precipitated solid was filtered, washed with water and dried to yield 6 g of crude material. A portion of this (3 g) was recrystallized from 100–120 petroleum ether to yield 1.3 g of the intermediate 1,5-dihydroxy-2,6-dinonyl-4-nitro-8-phenylthioanthraquinone (structure confirmed by mass spectrometry).

(b) Preparation of 1,5-dihydroxy-2,6-dinonyl-4-phenylthio-5-(t-butylphenylthio)anthraquinone A mixture of 0.65 g of the above intermediate and 0.2 g of 4-t-butylphenylthiol in 10 ml pyridine was stirred at 90°–5° C. for 16 hours and then drowned out into 50 ml of dilute HCl. The precipitated solid was filtered, washed successively with water and methanol and dried. It was then recrystallised from 40–60 petroleum ether to yield 0.1 g of product consisting mainly of 1,5-dihydroxy-2,6-dinonyl-4(4-t-butylphenylthio)-8-phenylthio-AQ (structure confirmed by mass spectrometry).

(c) Preparation of 1,5-dihydroxy-2,6-dinonyl-4-phenylthio-8-aminoanthraquinone A solution of 10 g of Na$_2$S.9H$_2$O and 2 g of sulphur in 20 ml of water was added to 3.0 g of the product of Example 23(a) in 100 ml of water and 50 ml of pyridine and heated to 90° C. After 1 hour at 90° C. the pyridine was evaporated and the remainder cooled to 60° C. The oil which separated was extracted into 100–120 petroleum ether and the water removed (by Dean & Stark). The solution was purified by passage through a silica gel column and a small quantity of HCl added to precipitate a solid. The solid (1.2 g) was dried at 70° C. and the structure confirmed by mass spectral and NMR analysis.

(d) Preparation of 1,8-dihydroxy-2,7-di-nonyl-4-phenylthio-5-aminoanthraquinone The procedure of Example 23(c) was repeated using 3.0 g of 1,8-dihydroxy-2,6-dinonyl-4-phenylthio-5-amino-AQ in place of the product of Example 23(c). The 1,8-dihydroxy-2,6-dinonyl-4-phenylthio-5-amino-AQ was prepared according to the method of Example 23(a) using 5.8 g of 1,8-dihydroxy-2,7-dinonyl-4,5-dinitro-AQ in place of the 1,5-dihydroxy-2,6-dinonyl-4,8-dinitro-AQ.

The 1,5-dihydroxy-2,6-dinonyl-4,8-dinitro-AQ and the 1,8-dihydroxy-2,7-dinonyl-4,5-dinitro-AQ were made according to the method described in U.K. Patent Specification No. 2038809A by reacting 1,5-dihydroxy-AQ and 1,8-dihydroxy-AQ, respectively, with nonanal and nitrating the di-nonyl derivatives. The alkyl radical in the nonanal had the formula:

Example 24

(a) Preparation of 1,8-dihydroxy-2,7-didocyl-4-phenylthio-5-nitroanthraquinone A mixture of 6.6 g of 1,8-dihydroxy-2,7-didodecyl-4,5-dinitro-AQ, 1.1 g of thiophenol and 100 ml pyridine were stirred mixed at ambient temperature for 2 hours and then drowned out into 200 ml water. The precipitated solid was filtered, washed successively with water and methanol and dried to yield 4.5 g of crude material. After recrystallisation from 100–120 petroleum ether the product was 1,8-dihydroxy-2,7-didodecyl-4-phenylthio-5-nitro-AQ (4.15 g: structure confirmed by mass spectrometry).

(b) Preparation of 1,8-dihydroxy-2,7-didocyl-4-phenylthio-5-(4-t-butylphenylthio)anthraquinone A portion of this intermediate (3.7 g) was added to a solution of 0.83 g of 4-t-butylphenylthiol and 0.3 g KOH in 50 ml iso-propanol at 65° C. After heating the mixture at the reflux (83° C.) for 3 hours it was cooled to ambient temperature, filtered, washed successively with isopropanol and methanol, dried and recrystallised from 100–120 petroleum ether. The product (2.75 g) was essentially 1,8-dihydroxy-2,7-didodecyl-4-phenylthio-5-(4-t-butylphenylthio)AQ.

The 1,8-dihydroxy-2,7-didodecyl-4,5-dinitro-AQ was made according to the method described in U.K. Patent Specification No. 2038809A by reacting 1,8-dihydroxy-AQ with n-dodecanal and nitrating the di-n-dodecyl derivative.

Example 25

(a) Preparation of 2,7-Di-n-pentylchrysazin

Chrysazin (120 g) was stirred into a solution of 120 g of sodium hydroxide in a mixture of water (1500 ml) and pyridine (220 ml) at 55° C. Sodium hydrosulphite (200 g) was added to the mixture which was stirred under N2 for 30 minutes before addition of a further 100 g of sodium hydrosulphite. The reaction mixture was heated to 80° C., over 30 minutes during which period was added, dropwise, n-pentanal (142 g) and the mixture stirred for 2 hours at 80° C. still under $N_2$. It was then cooled to room temperature, poured into an acidified ice/water mixture (ice/water: 4 liters and 35% HCl: 700 ml), in which it was stirred for 2 hours, filtered and the filter cake washed with water. The tarry cake was slurried in 400 ml of ethyl acetate, filtered, washed with methanol and pulled until damp-dry. This paste was recrystallised from ethyl acetate to give 83 g of dry product (yield 45%) melting at 127° C. Elemental analysis gave C=76.1% (75.8%) and H=7.5% (7.4%).

(b) Preparation of 2,7-Di-n-pentyl-4,5-dinitrochrysazin 2,7-Dipentylchrysazin (56 g) from Example 25(a) was stirred in 800 ml of 98% sulphuric acid at room temperature for 30 minutes and then cooled to 0° C. To the cooled mixture was added, dropwise over a period of 30 minutes while maintaining the temperature <10° C., 160 ml of an anhydrous nitration acid, comprising 33% nitric acid and 67% sulphuric acid, and the mixture stirred for 2 hours at <10° C. The mixture was then poured into 4 liters of ice/water, stirred at room temperature for 30 minutes, filtered, washed acid-free and dried to give 50.5 g (yield 73%) of dry product melting at 140° C. Elemental analysis gave C=58.8% (61.3%), H=5.4% (5.5%) and N=5.5% (6.0%)

(c) Preparation of 2,7-Di-n-pentyl-4-phenylthio-5-nitrochrysazin

To a mixture of 9.4 g of 2,7-di-n-pentyl-4,5-dinitrochrysazin from Example 25(b) in 200 ml of pyridine at 20° C. there was added a solution of 2.2 ml of thiophenol in 50 ml of pyridine. The colour of the mixture gradually changed from orange-brown to red and after 2 hours at 20° C. was drowned into water, filtered, washed successively with water and methanol and dried to yield 9.5 g of product (88% theory). The structure was confirmed by mass spectrometry and elemental analysis, C=67.5 (67.5) H=5.8 (5.8) S=6.7 (6.0) and N=3.0 (2.7). This product had a molar extinction coefficient of 12,541 at 540 nm in chloroform.

(d) Preparation of 2,7-di-n-pentyl-4-phenylthio-5-(4-t-butylphenylthio)-chrysazin To a mixture of 1.7 ml of 4-t-butylphenylmercaptan and 0.4 g of KOH in 50 ml of isopropanol at 60° C. was added 3.7 g of the product of Example 25(c) and the temperature raised to 80° C. for 1.5 hour. It was then cooled to room temperature, filtered, washed successively with isopropanol and methanol and dried to give 3.5 g of product. After recrystallisation from petroleum ether, the structure was confirmed by mass spectrometry and elemental analysis, C=73.0 (73.6) H=6.5 (6.8) S=9.1 (9.8). This product had a molar extinction coefficient of 19,183 at 592 nm in chloroform.

Example 26

(a) Preparation of 2,7-Di-n-heptyl-chrysazin

The process of Example 25(a) was repeated except for the replacement of the 142 g of of n-pentanal with 171 g of n-heptanal. The quantity of dry product was 103 g (yield 47.6%) which melted at 116°–118° C. Elemental analysis gave C=76.1% (75.8%) and H=7.5% (7.4%).

(b) Preparation of 2,7-Di-n-heptyl-4,5-dinitrochrysazin

The process of Example 25(b) was repeated using 87.2 g of 2,7-di-n-heptylchrysazin in place of the 56 g of 2,7-di-n-pentylchrysazin and increasing the quantity of the other ingredients by 25%. The quantity of dry product was 50.5 g (yield 69.1%) melting at 140° C. Elemental analysis gave C=58.8% (61.3%), H=5.4% (5.5%) and N=5.5% (6.0%).

(c) Preparation of 2,7-Di-n-heptyl-4-phenylthio-5-nitrochrysazin

The process of Example 25(c) was repeated using 9.6 g of 2,7-n-heptyl-4,5-dinitrochrysazin in place of the 9.4 g of 2,7-di-n-pentyl-4,5-dinitrochrysazin. The structure was confirmed by mass spectrometry. This product had a molar extinction coefficient of 12,095 at 540 nm in chloroform.

(d) Preparation of 2,7-Di-n-heptyl-4-phenylthio-5-(4-t-butylphenylthio)-chrysazin The process of Example 25(d) was repeated using 3.8 g of 2,7-di-n-heptyl-4-phenylthio-5-nitrochrysazin in place of the 3.7 g of 2,7-di-n-pentyl-4-phenylthio-5-nitrochrysazin. After recrystallisation from petroleum ether, the structure was confirmed by mass spectrometry. This product had a molar extinction coefficient of 19,650 at 592 nm in chloroform.

Example 27

A sample of the product prepared according to the process described in Example 1 was passed through a high pressure liquid chromatography column packed with Partisil 5u (250×4.6 mm) using 99:1 hexane:acetonitrile as eluent at a flow rate of 2 ml/min and ambient temperature (20° C.). Detection was by means of a u.v. source (254 nm) and samples, corresponding to all the peaks in the chromatogram, were collected. The fractions collected are identified in Table 3, together with their properties in the liquid crystal medium, E43, at 20° C.

TABLE 3

| Fraction | Structure | Solubility (%) | Order Parameter | max (nm) |
|---|---|---|---|---|
| 1 | Tetrakis-X-AQ | 1.8 | 0.78 | 550 |
| 2 | Tri-X-mono-Y-AQ | 10.7 | 0.78 | 550 |
| 3 | Di-X-di-Y-AQ | <0.5 | — | 550 |
| 3a | Di-X-di-Y-AQ | 1.0 | 0.78 | 550 |
| 4 | Di-X-di-Y-AQ | 2.9 | 0.77 | 550 |
| 5 | Mono-X-tri-Y-AQ | 1.0 | 0.78 | 550 |
| 6 | Tetrakis-Y-AQ | <1.0 | 0.78 | 550 |

In Table 3, X represents 4-t-butylphenylthio- and Y represents phenylthio-.

Fractions 3 and 3a had the same retention time and were separated by their different solubilities in the eluent.

Example 28

A black mixture dye was made by mixing together 48 parts of the yellow dye of Example 11, 33 parts of the red dye of Example 1 and 19 parts of the pleochroic blue dye, 1,8-dihydroxy-4,5-diamino-2,7-di-isobutylanthraquinone. A 3.65% solution of this dye in Liquid Crystal Host 10 (see Table 5 below) is especially suitable for use in a $10^{-5}$ m reflective, guest-host display with a single polariser, (Fréederickzs effect positive type.)

Example 29

A black mixture dye was made by mixing together 46 parts of the yellow dye of Example 11, 32.5 parts of the red dye of Example 1 and 21.5 parts of the pleochroic blue dye used in Example 26. A 6.5% solution of this dye in the liquid crystal mixture E43 is suitable for use in a phase change guest host display without a polariser (negative contrast type device).

The compounds described in the Examples have the properties identified in Table 4 as solutions in the liquid crystal medium, E43, at 20°C., unless otherwise stated.

TABLE 4

| Example | Solubility (%) | max (nm) | Order Parameter |
|---|---|---|---|
| 1 | 14.7 | 550 | 0.80 |
| 1 | 2.5 (−2° C.) | | |
| 2 | 1.0 | 550 | 0.80 |
| 3 | 3.0 | 550 | 0.77 |
| 4 | 4.7 | 550 | 0.75 |
| 6 | 3.2 | 464 | 0.80 |
| 7 | 3.3 | 464 | 0.78 |
| 8 | 2.4 | 464 | 0.78 |
| 9 | 2.5 | 464 | 0.80 |
| 10 | 2.9 | 464 | 0.78 |
| 11 | 8.6 | 464 | 0.79 |
| 11 | 4.4 (−2° C.) | | |
| 12 | 2.4 | 464 | 0.78 |
| 13 | 1.8 | 464 | 0.80 |
| 14 | 3.1 | 470 | 0.75 |
| 15 | 4.0 | 460 | 0.78 |
| 16 | 9.2 | 465 | 0.81 |
| 18 | 0.8 | 605 | 0.73 |
| 19 | 1.0 | 648 | 0.72 |
| 20 | 7.8 | 615 | 0.71 |
| 21 | 2.0 | 520 | 0.77 |
| 22 | 14.3 | 520 | 0.81 |
| 23(b) | 4.6 | 590 | 0.79 |
| 24(b) | 3.6 | 590 | 0.83 |
| 25(d) | 2.5 | 592 | 0.77 |
| 26(d) | 7.2 | 592 | 0.78 |
| 23(a) | 2.8 | 565/610 | 0.72 |
| 23(c) | 5.8 | 565/610 | 0.73 |
| 23(d) | 6.2 | 565/610 | 0.74 |

The properties of some of the dyes described in the Examples were also measured in other liquid crystal media (hosts) at 20° C., unless otherwise stated, and the results are set out in Table 5.

TABLE 5

| Host | Dye of Example | Order Parameter | Solubility (%) |
|---|---|---|---|
| 1 | 11 | 0.73 | |
| 1 | 6 | 0.72 | |
| 1 | 1 | 0.73 | |
| 2 | 11 | 0.79 | 4.0 |
| 2 | 6 | 0.80 | 2.0 |
| 2 | 1 | 0.80 | 4.6 |
| 3 | 11 | 0.81 | 2.5 |
| 3 | 6 | 0.81 | 1.5 |
| 3 | 1 | 0.79 | ca 5.0 |
| 4 | 11 | 0.74 | |
| 4 | 1 | 0.75 | |
| 5 | 6 | 0.68 | 3.1 |
| 5 | 1 | 0.75 | 7.2 |
| 6 | 6 | 0.78 | 2.0 |
| 8 | 6 | 0.78 | |
| 9 | 11 | 0.81 | |
| 9 | 6 | 0.81 | |
| 9 | 1 | 0.80 | |
| 10 | 11 | 0.78 | 4.0 (−2° C.) |
| 10 | 1 | 0.78 | 1.1 (−2° C.) |
| 11 | 11 | 0.78 | >5.0 |
| 11 | 11 | | 4.4 (−2° C.) |
| 11 | 1 | 0.80 | >5.0 |
| 11 | 1 | | 2.2 (−2° C.) |
| 12 | 11 | 0.77 | 2.0 |
| 12 | 1 | 0.78 | 3.0 |

The liquid crystal materials referred to in Table 5 as Hosts 1 to 12 have the following compositions:

Host 1 is the liquid crystal material E7, available from BDH Chemicals Ltd, which includes the compounds:
4-cyano-4′-n-heptyl-biphenyl 25%
4-cyano-4′-n-pentyl-biphenyl 51%
4-cyano-4′-n-octyloxy-biphenyl 16%
4-cyano-4″-n-pentyl-p-terphenyl 8%

Host 2 is the liquid crystal material ZLI 1132, available from E Merck & Co, which includes the following compounds:
1-cyano-4-(n-propylcyclohexyl)benzene,
1-cyano-4-(n-pentylcyclohexyl)benzene,
1-cyano-4-(n-heptylcyclohexyl)benzene, and
4-cyano-4′-(4″-n-pentylcyclohexyl)biphenyl Host 3 is the liquid crystal material ZLI 1695, available from E Merck & Co, Darmstadt, West Germany. This has a clearing point (nematic to isotropic transition temperature) of 72° C.

Host 4 is a mixture of alkyl-cyanophenyl-dioxanes containing n-propyl, n-pentyl and n-heptyl chains.

Host 5 is the liquid crystal material ZLI 1565, available from E Merck & Co. This has a clearing point of 85° C.

Host 6 is the liquid crystal material ZLI 1624, available from E Merck & Co. This has a clearing point of 87° C.

Host 7 is the liquid crystal material RO TN 403 supplied by F Hoffman La Roche Co., Basle. This has a clearing point of 82° C. and includes mixture of cyanophenylpyrimidine compounds.

Host 8 is the liquid crystal material RO-TN 430 available from Hoffmann La Roche Co. This has a clearing point of 69° C.

Host 9 is a mixed bicyclo-octane liquid crystal material containing the following compounds:
1-cyano-4[n-propyl-bicyclo(2,2,2)octyl]benzene 30%
1-cyano-4[n-pentyl-bicyclo(2,2,2)octyl]benzene 40%
1-cyano-4[n-heptyl-bicyclo(2,2,2)octyl]benzene 30%

Host 10 is a mixture of liquid crystal materials based mainly on cyanobiphenyls and available from BDH Chemicals Ltd under the name E61.

Host 11 is a mixture of liquid crystal materials based mainly on cyanobiphenyls and available from BDH Chemicals Ltd under the name E49.

Host 12 is a mixture of fluorobicyclo(2,2,2)octane esters having negative anisotropy and containing a mixture of two compounds of the following formula:

1-alkyl-3-fluoro-4-[4-alkyl-bicyclo(2,2,2)octylcarbonyloxy]-benzene 1 wherein both alkyl groups are n-pentyl 55%
2 wherein one is pentyl and one n-propyl 45%

Hosts 1 to 9 and 12 are in fact the same as the Hosts of the same numbers specified in published U.K. patent application No. GB 2093475.

The very high stability of the dyes of the present invention is illustrated in Table 6, which sets out the results of experiments to determine the effect of exposing solutions of the dyes in a liquid crystal medium (E43) to u.v. and visible radiation. Deterioration of the dye was detected by a decrease in the absorption of the solution at max. The times (in hours) quoted in the table are for a reduction of 10% from the initial value.

TABLE 6

| Radiation | Time (hours) for 10% Reduction in Absorption Dye of: | |
|---|---|---|
|  | Example 6 | Example 1 |
| "Black" light (U.V., 20° C.) | 10,000 | 20,000 |
| Xenon arc (40° C.) (U.V. + visible) | 5,000 | 5,000 |

A further example of a neutral (or 'black') mixture using a dye of Formula XVII is Dye Mixture A as follows:

| Dye Mixture A (four components) | |
|---|---|
| Component | Parts by weight |
| [structure: (CH$_3$)$_2$CHCH$_2$—anthraquinone with OH, OH, H$_2$N, NH$_2$ substituents—CH$_2$CH(CH$_3$)$_2$] | 1.0 (Blue) |
| [structure: anthraquinone with S—C$_6$H$_4$—C(CH$_3$)$_3$ and (CH$_3$)$_3$C—C$_6$H$_4$—S substituents] | 3.0 (Orange) |
| [structure: anthracene with S—C$_6$H$_5$ and (CH$_3$)$_3$C—C$_6$H$_4$—S substituents] | 2.0 (Yellow) |
| [structure: n-C$_7$H$_{15}$—anthraquinone with OH, OH, C$_7$H$_{15}$—n substituents and (CH$_3$)$_3$C—C$_6$H$_4$—S, S—C$_6$H$_5$] | 1.0 (Red/Purple) |

The first mentioned blue component is in a class of dyes further described in published U.K. patent application No. G.B. 2,081,736.

Preferably, the stated parts by weights of the components are the percentages by weight in a liquid crystal host such as E43.

BRIEF DESCRIPTION OF THE DRAWINGS

Examples of liquid crystal devices embodying the second aspect of the present invention will now be described with reference to the accompanying drawings in which:

FIG. 1 is an exploded view of a Fréedericksz effect display device embodying the present invention, FIG. 2 is a sectional view of the device shown in FIG. 1; and FIG. 3 is a front view of a watch having a liquid crystal display constructed as shown in FIGS. 1 and 2.

DETAILED DESCRIPTION OF THE DRAWINGS

As shown in FIG. 1 a liquid crystal display of the Freedericksz effect (positive nematic) type includes a liquid crystal cell 3 comprising two glass slides 4, 5 containing a layer of liquid crystal material 6 which is basically a positive nematic material together with a pleochroic dye. Electrodes 7, 8 eg of tin oxide are arranged on the inner faces of the slides 4, 5. A brushed aluminium reflector 27 may be located behind the slide 5.

Prior to assembling the cell 3 the slides 4, 5 (already bearing the electrodes 7, 8) are coated on their inner faces with silicon monoxide or magnesium fluoride. This coating is formed by evaporating a stream of eg silicon monoxide onto the slide at an angle of about 5° to the surface as for example described in U.K. Patent Specification No. 1,454,296. On assembly the slides are arranged with the evaporation direction on the two slides 4, 5 parallel to one another. With such coatings applied liquid crystal molecules at the coated surfaces lie in a single direction (parallel to the evaporation direction) and at an angle of about 25° to 35° typically about 30° to the adjacent slide surface. As a result the liquid crystal molecules lie in a parallel homogeneous texture as indicated by arrow 13 (FIG. 1). The dye molecules in guest-host relationship with the liquid crystal molecules are also roughly in this texture giving a relatively strongly coloured appearance to the cell 3 (which is black or grey if the dye absorbs uniformly throughout the visible spectrum.

A single polariser 1 placed in front of, or behind, the cell 3 (shown in front in FIG. 1) with its transmission axis parallel to the alignment direction of the liquid crystal material 6, will enhance the colour of the display in this state, the "off" state. By this arrangement the electric vector of the incident or reflected light is confined roughly parallel to the transition of the dye molecules.

When a suitable voltage, eg a few volts, (greater than the threshold to give the effect) is applied between the electrodes 7 and 8, ie to give the "on" state, the molecules of the liquid crystal material are switched to the homeotropic texture, ie to lie parallel to the electric field along an axis perpendicular to the slides 4, 5. The dye molecules are also switched to this texture by the guest-host effect and have their long axes essentially parallel (ie they are essentially "end-on") to light incident on the cell 3 in a direction perpendicular to the slides 4, 5, effectively reducing their absorption of ambient light. This gives the cell 3 a relatively clear or weakly coloured appearance.

If the electrodes 7 and 8 cover only part of the inner surface of the slides 4 and 5 respectively the entire cell 3 will appear strongly coloured (ie strongly reflects) in the "off" state whereas in the "on" state only the region of the liquid crystal material 6 between the electrodes 7, 8 will appear clear or weakly coloured in the "on" state the remainder of the cell 3 appearing strongly coloured, ie remaining in the "off" state. (If the pleochroic dye absorbs uniformly throughout the visible spectrum the strong colouration will appear black or grey.)

Thus, by shaping the electrodes 7, 8 into discrete facing parts, eg bars of a digit separately connectable to a voltage source (not shown), symbols or letters may be displayed. This may be achieved by photoetching (in a known way) the layers, eg SnO$_2$, used to form the electrodes 7, 8 prior to assembly.

For example, in the watch display of FIG. 3 the electrodes 7, 8 are shaped to provide four seven bar numeric digits to display time; eg the digits are displaying 12.45 as shown in FIG. 3. A pulsed period dot P is also included, as in conventional watch displays, to indicate operation of the display.

Examples of suitable dyed liquid crystal material for use as the material 6 above is the above mentioned Dye Mixture A dissolved in one of the two hosts E43 and Host 1 defined above (the thickness of the material 6 layer being 12 μm).

In an alternative device embodying the second aspect of the present invention a cholesteric to nematic phase change effect is made in a known way. The method of construction is the same as that described above with reference to FIGS. 1 to 3 except that no MgF$_2$ or SiO coating is applied to the inner surfaces of the electrode bearing slides 4, 5, no polariser 1 is required and the liquid crystal material 6 in this case is essentially a long pitch cholesteric material (having a molecular helical pitch of the order of about 2 μm containing a pleochroic dye). A suitable material is one of the two hosts E43 and Host 1 defined above containing Dye Mixture A defined above (as used in the specific Fréedericksz effect device described with reference to FIGS. 1 to 3) (the thickness of the material 6 layer again being 12 μm).

In the "off" state (with no voltage applied) the cell 3 again appears strongly coloured in this case (as in the Fréedericksz effect device). The liquid crystal material 6 in this state is in the focal conic texture which comprises an arrangement of random molecular helices. The dye molecules take up the same arrangement by the guest-host effect. The strong colouration (which may be black or dark grey) is because ambient white light incident on the material 6 via the slide 4 is partially absorbed by the dye molecules which are perpendicular or oblique to the light propagation direction.

In the "on" state a voltage (typically 10–15 volts) is applied between the electrodes 7, 8 sufficient to give the homeotropic texture, ie with the liquid crystal molecules between the electrodes 7, 8 essentially re-orientated to lie perpendicular to the slides 4, 5. The dye molecules between the electrodes 7, 8 are re-orientated to this arrangement by the guest-host effect. The region between the electrodes 7, 8 appears clear or weakly coloured in this state (as with the Fréedericksz effect device) because the dye molecules are essentially "end-on" to ambient light propagating in a direction perpendicular to the cell 3, ie perpendicular to the slides 4, 5 (via the slide 4).

A suitable host in this case is either E43 or Host No. 1 specified above (96% by weight) plus CB 15 (4% by weight). Dye Mixture A defined above may be used as the guest dye.

CB 15 is the compound

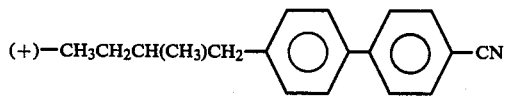

supplied by BDH Chemicals Ltd.

We claim:

1. A material adapted for use in a guest-host liquid crystal device which comprises a solution of a liquid crystal host material and a pleochroic dye dissolved in said host to an extent to adapt said material for said use, wherein the pleochroic dye comprises at least one anthraquinone compound free from water solubilizing and ionic substituents and having the formula:

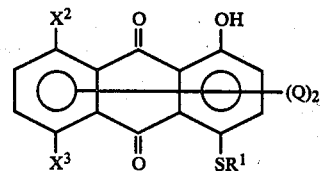

wherein:
X$^2$ and X$^3$ are selected from OH and —SR$^2$
provided that
when X$^2$ is OH X$^3$ is —SR$^2$ and when X$^3$ is OH X$^2$ is —SR$^2$;
each Q is C$_{1-20}$-alkyl and adjacent to an OH group; and R$^1$ and R$^2$ are different and selected from alkyl, mono- or bi-cyclic aryl and cycloalkyl.

2. A material as claimed in claim 1 in which the anthraquinone dye has the formula:

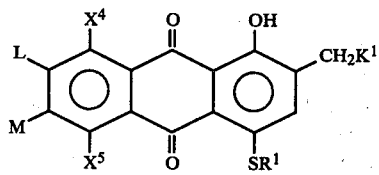

wherein:
L and M are H or CH$_2$K$^1$;
X$^4$ and X$^5$ are OH or SR$^2$,
provided that
when X$^4$ is OH X$^5$ is SR$^2$, L is CH$_2$K$^2$ and M is H; and
when X$^5$ is OH X$^4$ is SR$^2$, M is CH$_2$K$^2$ and L is H;
K$^1$ and K$^2$ are C$_{1-20}$-alkyl;
R$^1$ is mono- or bi-cyclic aryl; and
R$^2$ is different from R$^1$ and selected from C$_{1-20}$-alkyl,
mono- or bi-cyclic aryl and
C$_{4-8}$-cycloalkyl.

3. A material as claimed in claim 1 in which the anthraquinone compound is such that at least one of the alkyl, aryl and cycloalkyl radicals represented by R$_1$ and R$_2$ carries a non-ionic substituent.

4. A material as claimed inc claim 3 in which the anthraquinone compound is such that the radicals R$_1$ and R$_2$ are aryl radicals and there is a substituent on at least one of the aryl radicals selected from C$_{1-10}$-alkyl, C$_{4-8}$-cycloalkyl and phenyl.

5. A material as claimed in claim 1 in which the dye comprises a mixture comprising at least one unsymmetrical di(substituted thio)anthraquinone having the formula specified in claim 1, in which the two substituted thio groups are different, and at least one symmetrical di(substituted thio)anthraquinone having the same overall general formula as specified in claim 1 but in which the two substituted thio groups are identical.

6. A material as claimed in claim 5 in which the said mixture comprises at least 50% by weight of the unsymmetrical di(substituted thio)anthraquinone.

7. A material as claimed in claim 1 in which the product of the molar extinction of the pleochroic dye and the solubility of that dye in moles/liter is at least 500 cm$^{-1}$.

8. A material as claimed in claim 1 in which one of the groups $R^1$ and $R^2$ is phenyl and the other is 4-alkylphenyl.

9. A material as claimed in claim 1 in which the groups $K^1$ and $K^2$ are identical n-alkyl groups having from three to twelve carbon atoms.

10. A material as claimed in claim 8 in which the alkyl group contained in the 4-alkylphenyl group has a branched chain and from 3 to 8 carbon atoms.

11. A material as claimed in claim 10 in which the alkyl group contained in the 4-alkylphenyl group is t-butyl.

12. A material as claimed in claim 1 in which the dye comprises the compound 1,8-dihydroxy-2,7-di-n-heptyl-4-phenythio-5-(4-t-butylphenylthio)anthraquinone.

13. A material as claimed in claim 1 and wherein for each compound contained in the dye the product of molar extinction coefficient and the solutibility of the dye in moles per liter is at least 500 cm$^{-1}$.

14. A material as claimed in claim 1 and wherein each compound contained in the pleochroic dye forms between 0.85 and 10 percent by weight of the material.

15. A material as claimed in claim 1 and wherein each compound contained in the pleochroic dye forms between 0.5 and 5 percent by weight of the material.

16. A material as claimed in claim 1 and wherein the pleochroic dye comprises a mixture of dyes of a different colour, at least one of which is a dye compound of the formula as defined in claim 1.

17. A material as claimed in claim 16 and wherein the pleochroic dye includes a mixture of a blue dye, a purple dye and a yellow dye, the purple dye being a compound of said formula 1.

18. A material as claimed in claim 17 and wherein the mixture also includes any orange dye and comprises a neutral coloured mixture.

19. A material as claimed in claim 16 and wherein the pleochroic dye comprises a neutral coloured mixture of a yellow dye, a red or purple/red dye and a blue dye at least one of which is a compound of said formula.

20. A material as claimed in claim 1 and wherein the liquid crystal material comprises mainly 4-n-alkyl-or alkoxy-4'-cyanobiphenyl compounds.

21. A material as claimed in claim 1 and wherein the liquid crystal material comprises mainly 1-(4'-cyanophenyl)-4-n-alkylcyclohexane compounds.

22. A material as claimed in claim 1 and wherein the liquid crystal material is suitable for a cholesteric to nematic phase change effect device and comprises a nematic liquid crystal material together with a chiral agent.

23. A material as claimed in claim 20 and wherein the liquid crystal material is suitable for a cholesteric to nematic phase change effect device and comprises a nematic liquid crystal material together with a chiral agent.

24. A material as claimed in claim 21 and wherein the liquid crystal material is suitable for a cholesteric to nematic phase change effect device and comprises a nematic liquid crystal material together with a chiral agent.

25. A liquid crystal electro-optical device including two electrically insulating substrates at least one of which is optically transparent, electrodes on the inner surfaces of the substrates and a film of dielectric material contained between the substrates, wherein the improvement comprises the dielectric material being a dyed liquid crystal material as claimed in claim 1.

26. A liquid crystal device as claimed in claim 25 and wherein the device is a cholesteric to nematic phase change effect device.

27. A liquid crystal device as claimed in claim 25 and wherein the device is a Fréedericksz effect device.

28. A liquid crystal device as claimed in claim 25 and wherein the device is a twisted nematic effect device.

* * * * *